(12) United States Patent
Newcombe et al.

(10) Patent No.: US 10,315,418 B2
(45) Date of Patent: Jun. 11, 2019

(54) METHOD, SYSTEM, AND DEVICE FOR SUPPLYING ELECTRICAL ENERGY THROUGH ELECTRICAL CONDUCTORS ADJACENT TO ELECTROLYTE SOLUTION ENVIRONMENTS

(71) Applicant: Archipelago Technology Group LTD, Cambridge (GB)

(72) Inventors: Guy Charles Fernley Newcombe, Cambridge (GB); Daniel Richard Mace, Cambridge (GB); Nicholas James Hastings, Cambridge (GB)

(73) Assignee: Archipelago Technology Group, LTD, Cambridge (GB)

( * ) Notice: Subject to any disclaimer, the term of this patent is extended or adjusted under 35 U.S.C. 154(b) by 0 days.

(21) Appl. No.: 15/558,495

(22) PCT Filed: Mar. 21, 2016

(86) PCT No.: PCT/GB2016/050784
§ 371 (c)(1),
(2) Date: Sep. 14, 2017

(87) PCT Pub. No.: WO2016/151308
PCT Pub. Date: Sep. 29, 2016

(65) Prior Publication Data
US 2018/0079208 A1      Mar. 22, 2018

(30) Foreign Application Priority Data

Mar. 20, 2015 (GB) .................................. 1504765.7

(51) Int. Cl.
*B41J 2/06* (2006.01)
*B41J 2/045* (2006.01)
(Continued)

(52) U.S. Cl.
CPC ............. *B41J 2/06* (2013.01); *B41J 2/04541* (2013.01); *B41J 2/04576* (2013.01);
(Continued)

(58) Field of Classification Search
USPC .......................................................... 347/10
See application file for complete search history.

(56) References Cited

U.S. PATENT DOCUMENTS 3,166,487 A    1/1965   Owren
3,623,965 A    11/1971  Owren et al.
(Continued)

FOREIGN PATENT DOCUMENTS

EP    0779151 A2    6/1997
JP    S56130371 A   10/1981
(Continued)

OTHER PUBLICATIONS

International Search Report issued in related International Application No. PCT/GB2016/050784, dated Jun. 23, 2016 (3 pgs.).
(Continued)

*Primary Examiner* — Lam S Nguyen
(74) *Attorney, Agent, or Firm* — Finnegan, Henderson, Farabow, Garrett & Dunner LLP

(57) ABSTRACT

Systems and methods for controlling supply of electrical energy from power source(s) through a plurality of electrical conductors adjacent to a common electrolyte solution are disclosed. The power source(s) are controlled to apply potential difference waveform(s) between pairs of electrical conductors formed from the plurality of electrical conductors such that the potential difference waveform(s) have a magnitude that exceeds a threshold overpotential for the pairs of electrical conductors in the electrolyte solution while sums of an absolute value of a potential difference across a double layer associated with the first electrical
(Continued)

conductor in a pair and an absolute value of a potential difference across a double layer associated with a second electrical conductor in the pair is maintained below the threshold overpotential. Some or all electrical conductor(s) can be coupled to the power source(s) using respective capacitor(s).

20 Claims, 25 Drawing Sheets

(51) Int. Cl.
*H02J 7/00* (2006.01)
*H02J 7/34* (2006.01)
(52) U.S. Cl.
CPC .......... *H02J 7/0018* (2013.01); *H02J 7/0093* (2013.01); *H02J 7/345* (2013.01)

(56) References Cited

U.S. PATENT DOCUMENTS

| | | | |
|---|---|---|---|
| 4,728,877 A | 3/1988 | Adamson | |
| 5,750,071 A | 5/1998 | Fiorino et al. | |
| 6,113,209 A * | 9/2000 | Nitta | B41J 2/04541 347/10 |
| 6,189,536 B1 | 2/2001 | Martinez et al. | |
| 6,312,080 B1 * | 11/2001 | De Roos | B41J 2/04541 347/10 |
| 6,783,223 B2 | 8/2004 | Okada et al. | |
| 6,802,582 B2 * | 10/2004 | Rupprecht | B41J 2/04541 347/10 |
| 7,638,032 B2 | 12/2009 | Zhou et al. | |
| 8,034,229 B2 | 10/2011 | Zhou et al. | |
| 2005/0231179 A1 | 10/2005 | Ishizaki | |
| 2011/0242172 A1 | 10/2011 | Yoshino et al. | |
| 2012/0212530 A1 | 8/2012 | Makita et al. | |
| 2013/0321530 A1 | 12/2013 | Taga et al. | |
| 2014/0197797 A1 | 7/2014 | Yamazaki | |
| 2014/0253619 A1 | 9/2014 | Norigoe | |
| 2014/0367270 A1 | 12/2014 | Williamson | |

FOREIGN PATENT DOCUMENTS

| | | |
|---|---|---|
| JP | S57156266 A | 9/1982 |
| JP | S6126272 A | 2/1986 |
| JP | S63224961 A | 9/1988 |
| JP | H03222755 A | 10/1991 |
| JP | H04292948 A | 10/1992 |
| JP | H1081019 A | 3/1998 |
| JP | 2002347241 A | 12/2002 |
| JP | 2004017284 A | 1/2004 |
| JP | 2004202955 A | 7/2004 |
| WO | WO 96/17426 A1 | 6/1996 |
| WO | WO 9842512 A1 | 10/1998 |
| WO | WO 02057086 A1 | 7/2002 |

OTHER PUBLICATIONS

Written Opinion of the International searching Authority issued in related International Application No. PCT/GB2016/050784, dated Jun. 23, 2016 (8 pgs.).
Combined Search and Examination Report under Sections 17 and 18(3) issued by the UK Intellectual Property Office in related Foreign Application No. GB1604757.3, dated Dec. 8, 2016 (2 pgs.).
Combined Search and Examination Report under Sections 17 and 18(3) issued by the UK Intellectual Property Office in related Foreign Application No. GB1504765.7, dated Jan. 12, 2016 (2 pgs.).

* cited by examiner

1400

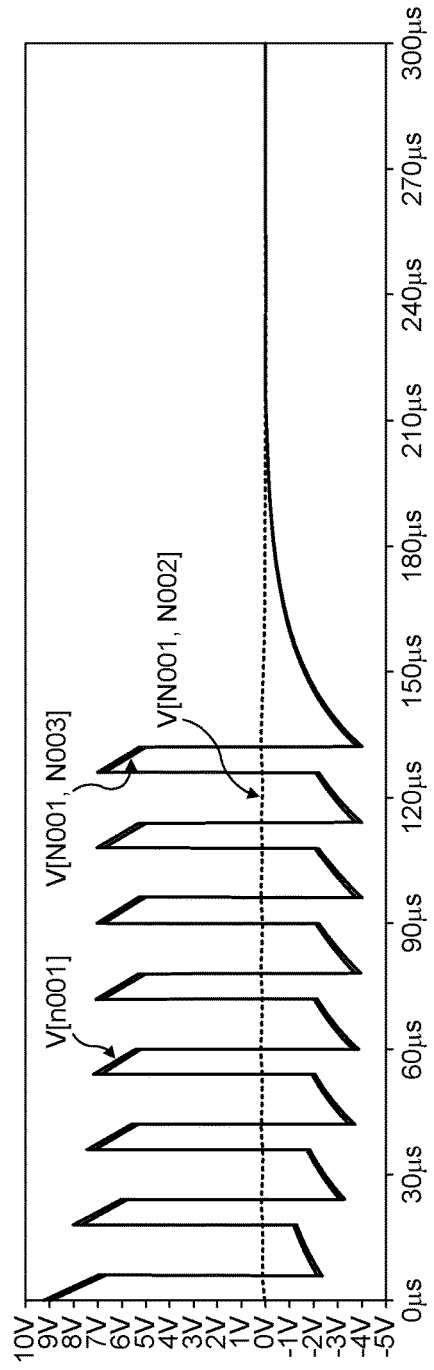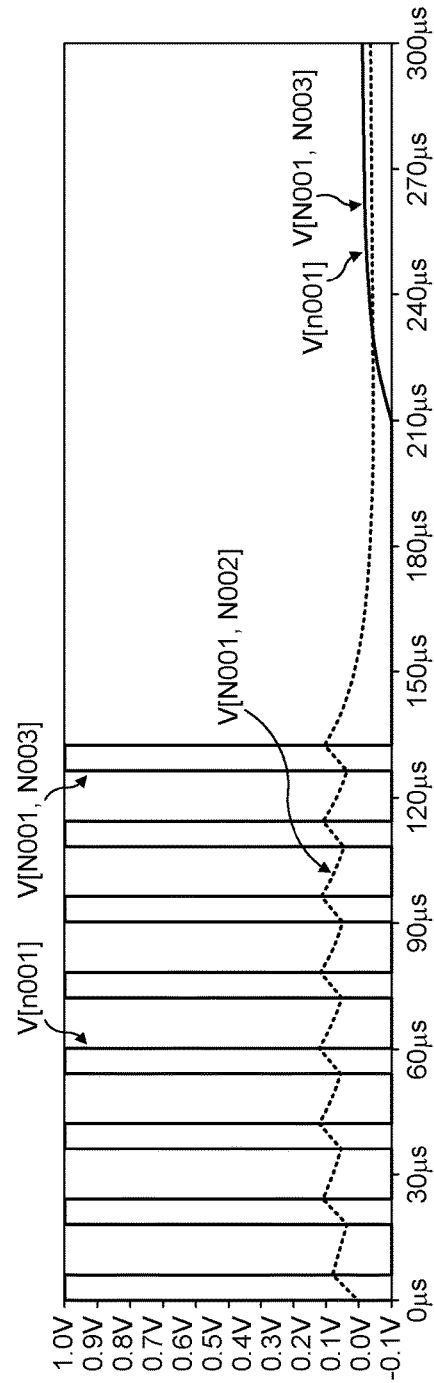

METHOD, SYSTEM, AND DEVICE FOR SUPPLYING ELECTRICAL ENERGY THROUGH ELECTRICAL CONDUCTORS ADJACENT TO ELECTROLYTE SOLUTION ENVIRONMENTS

The present application is a national phase application under 35 USC § 371 of International Application No. PCT/GB2016/050784, filed Mar. 21, 2016, and which claims priority from GB Application No. 1504765.7, filed Mar. 20, 2015, the contents of both of which are incorporated herein by referenced in their entirety.

FIELD OF THE TECHNOLOGY

The invention relates to techniques for supplying any combination of electrical energy, power, and signals, and in particular to supplying electrical energy, power, and signals to components, devices, systems, and assemblies whose operation requires transmission of electrical energy, power, or signals through electrical conductors that are adjacent to an electrolyte solution environment.

BACKGROUND

Aqueous environments, with the exception of pure water, are electrically conducting due to the presence of solvated ions therein. For example, the solid sodium chloride (NaCl) readily dissolves in water to produce positively-charged solvated sodium ions ($Na^+$) and negatively-charged solvated chloride ions ($Cl^-$). When an electric field is present within the aqueous solution, those ions migrate, producing electrical conduction.

A need to provide electrical energy, power, or electrical signals through electrical conductors that are in contact with, themselves pass through, or are generally proximal to aqueous environments arises in many applications. For example, it may be necessary in some applications to supply electrical energy or power to, or communicate with, a sensor, actuator, or other electrically-powered or electrically-responsive device (which hereinafter may simply be referred to as a 'device') on the other side of or in a wet or damp environment. Examples of such applications include powering underwater lights and providing power through underwater cables and electrical connectors that operate in liquid-contacted or submerged environments. Further, operation of certain devices, e.g., an immersion water heater, or certain types of ink jet printheads used with aqueous ink, requires the combination of water and the supply of electrical energy, power, or signals.

In some further applications, there is also an occasional need to provide electrical energy, power, or signals through electrical conductors that are adjacent to liquid environments comprising non-aqueous liquids, in which one or more salts have been dissolved. Examples of such applications again include supply of electrical energy to many forms of ink jet printheads, such as piezoelectric, thermal, and electrostatic printheads.

The present disclosure generally refers to both aqueous and non-aqueous liquids in which one or more salts have been dissolved as electrolyte solutions. A conductor, as referred hereinafter, generally encompasses any material through which electrical energy, power, or signals can be passed. For example, conductors and conducting electrodes, may be made from copper, aluminium, silver, gold, lead, nickel, silicon, carbon, titanium, platinum, mercury or organic materials such as dilithium benzenediacrylate. It should be noted that although silicon is normally classified as a semiconductor, undoped silicon has a typical resistivity of 10 $\Omega$m at room temperature and so behaves as a conductor in this context.

Hereinafter, the present disclosure refers to components, devices, systems, and assemblies to which a power source system supplies electrical energy, power, or signals as presenting an electrical load (or, simply, 'load') to the power source system. The nature of the load depends upon the nature of component, device, or system. For example, devices commonly presenting a primarily capacitive load include piezoelectric actuators such as those used in piezoelectric ink jet printheads.

Electrical energy, power, or signals can be supplied to devices using, for example, electrical conductors (e.g., electrodes) by the application of an electrical potential difference (voltage difference) between two or more of such conductors. The value of the required potential difference depends on the nature of the device to which the electrical energy, power, or signals are supplied. If those conductors are in contact with an electrolyte solution (for example, if they are partially or fully immersed in the electrolyte solution) and the potential difference required for the satisfactory supply of electrical energy, power, or signals to the device exceeds the potential difference at which electrochemical reactions can occur in the electrolyte solution, known as the overpotential, an electrical current flows in the electrolyte solution between the conductors.

Different electrochemical reactions may occur in a given set of conductors and electrolyte solution. Each such electrochemical reaction may be associated with a given set of conductors and electrolyte solution and has its own corresponding overpotential. This disclosure refers to the smallest overpotential between two conductors taken from a given set of conductors and electrolyte solution as the threshold overpotential or $V_{op}$.

For example, the overpotential to create hydrogen and oxygen on platinum electrodes is 1.11V and the overpotential to create hydrogen and chlorine on platinum electrodes is 0.26V. Therefore, for an aqueous electrolyte containing chloride ions, the threshold overpotential with platinum electrodes is 0.26V. In other words, the value of the threshold overpotential depends on the specific composition of the conductors and the electrolyte solution. Typically however the threshold overpotential for a given set of conductors and electrolyte solution is in the range 0.2V-2V.

Currents flowing from one conductor to another through the electrolyte solution as a result of an applied potential difference exceeding the overpotential are parasitic in the sense that they consume at least some of the electrical energy or power otherwise delivered to the device (so wasting energy). They are also indicative of a potentially undesirable series of electrochemical reduction and oxidation reactions being present.

Evolution of gaseous hydrogen and oxygen, and more generally, the oxidation of the material at the anode and the reduction of the material at the cathode, are examples of the electrochemical reactions that may occur in aqueous electrolyte solutions. Such electrochemical reactions are often undesirable in systems designed to provide electrical energy, power, or signals to devices in contact with or partially or fully immersed in the electrolyte solutions over long periods of time. For example, evolution of gases, such as hydrogen, adjacent to metals and piezoelectric materials can cause degradation of desirable material properties of such materials. Similarly many otherwise-desirable conductor materials, such as copper, become oxidised at the anode and ultimately fail, provided a supply of ions giving rise to conduction in the electrolyte solutions remains.

Conventionally, to prevent both waste of electrical energy and undesirable electrochemical reactions, the conductors are shielded from the electrolyte solution with a waterproof and insulating layer, such as a rubber or elastomer coating. This approach typically, though not always, works well for a large static electrical cable. However, such an approach is often impractical when cable flexibility is required, or in applications in which an electrical connection needs to be made and unmade within the electrolyte solution environment. The coating/shielding approach is also often impractical when the electrical conductor is placed adjacent to the electrolyte solution itself, as is the case, for example, with some designs of ink jet printheads. In applications requiring the electrical conductor to be placed adjacent to the electrolyte solution, the protection is often provided by applying a thin insulating coating to the electrical conductors, for example, a coating formed of soft polymeric materials, such as Parylene, or hard materials, such as silicon nitride ($Si_3N_4$). Unfortunately, the above described coating and shielding approaches fail in certain circumstances, thus rendering them unsatisfactory for at least some applications.

For example, mechanical damage to the conductor or its coating layer results in the removal of the coating layer from the conductor, and/or pinholes in the coating layer, and/or regions of the conductor that are not coated by the insulating layer. This in turn, will expose the conductor to the electrolyte solution, thereby allowing parasitic currents and undesirable electrochemical reactions to occur.

In addition, if the coating layer is thin and subject to extreme electric fields, such as of the order $10^7$ V/m, local imperfections within the coating layer can allow the dielectric strength of the insulator (coating layer) to be exceeded in the region of the imperfections. Consequently, pinhole-like conducting paths between the electrolyte solution and electrical conductor will open up, thereby allowing parasitic currents and undesirable electrochemical reactions to occur.

Further, while an electrical conductor is being coated with an insulating layer, a small number of water molecules and solvated ions can become trapped under the coating. This would create a thin film of electrolyte solution in-between the conductor and the insulating layer. When a potential (voltage) difference is created across the thickness of the thin film of the electrolyte solution, the water molecules and ions in the film are induced to undergo electrochemical reactions, thereby causing hydrogen and oxygen bubbles to form. These bubble formations can be problematic for thin coatings.

If the coating is thick however, repeated flexure of the conductor/coating assembly can induce cracks to be formed within the coating, exposing the conductor to the electrolyte solution and/or opening pinhole-like conducting paths between the electrolyte solution and electrical conductor. This in turn, allows parasitic currents and undesirable electrochemical reactions to occur.

In many devices, the electrical conductors are supported by a metallic shell that could for example take a form of an armoured sheath, a metal container, a chassis, or, in a case of an ink jet print head, ink supply pipes. These components may be connected to ground potential or allowed electrically to float. They can also form a part of the electrical circuit. For example, the nozzle plate of an ink jet print head, which can be made of stainless steel, electroplated nickel, silicon, or metallised polyimide, or the substrate can act as a part of the electrical circuit. Leaving the potential of such components uncontrolled can lead to destructive electrolytic currents at the conductor-electrolyte solution interface.

When a potential difference greater than the threshold overpotential is applied between two conductors adjacent to a common electrolyte solution, the following sequence of processes (stages) occurs:
1. A layer of electrical charge forms on the surface of each conductor, according to the applied potential difference.
2. Ions in the electrolyte solution are attracted towards and closely approach the surface of each conductor to form a layer of counter charge, thereby creating a charged double layer capacitance adjacent to the surface of each conductor. This disclosure refers to the characteristic time for formation of each charged double layer as its 'double layer charging time.'
3. A set of reversible reactions takes place on the surface of one or both conductors, for example, the reversible formation of metal hydrides at the cathode.
4. A set of irreversible reactions associated with the net electrical charge flow into the electrolyte solution from the conductor(s) occurs on the surface of one or both conductors, such as the creation of hydrogen bubbles at the cathode and/or the irreversible oxidation of the metal electrode at the anode. At this stage, the irreversible degradation of the conductors may be caused by the ionisation and dissolution of the metal electrode into the electrolyte solution, or the break-up of the metal surface as the oxide layer grows deeper into the anode structure. These redox reactions are often also associated with electrolysis of the electrolyte which can cause other forms of device failure.

Following the establishment of charge on the surface of each conductor in stage (1), the time taken for stages (2)-(4) varies with and depends on the conductor material, the conductor geometry, and the ionic content and pH value of the electrolyte solution. The double layer formed adjacent to the surface of each conductor can sustain only a certain maximum potential difference (at which the double layer may be considered fully charged) whose value is determined by the nature of the electrical conductor materials and of the electrolyte solution. The threshold overpotential, above which the irreversible reactions of stage (4) occur, can therefore be understood as the sum of the absolute values of the maximum potential difference that can be sustained by the double layer formed on the first conductor and the maximum potential difference that can be sustained by the double layer formed on the second conductor.

As mentioned, the supply of electrical energy to many forms of ink jet printheads, including certain types of piezoelectric, thermal, and electrostatic printheads, requires the electrodes supplying electrical energy to actuation components to be adjacent to the electrolyte solution. A 'shared wall' piezoelectric ink-jet printhead for example has an array of actuator walls separating chambers that in use are either (i) all filled with liquid to be ejected or (ii) are alternately filled with liquid and unfilled. Unfilled chambers may be referred to as 'dummy' chambers. In a 'shared wall' piezoelectric ink-jet printhead, electrical conductors in the form of electrodes (i.e., actuator electrodes) are arranged on one or more of the piezoelectric actuator components, and have a common fluid pathway and a support structure. The support structure typically contains other metallic, and thus conductive, components such as ink feed tubes which are also in close contact with the ink.

U.S. Pat. Nos. 6,106,092A, 6,193,343B1, and US2009/0073207A1 describe specific schemes for driving a shared wall piezoelectric printhead having multiple piezoelectric actuator components and a common liquid supply. U.S. Pat. No. 6,106,092A describes the ejection of droplets effected by applying positive and negative potentials of short duration to first liquid-wetted actuator electrodes whilst holding neighbouring liquid-wetted electrodes at ground potential. In this way, drive pulses having sharp edges and comprising both positive and negative potential differences between liquid-wetted electrodes are created. U.S. Pat. No. 6,193,343B1 describes with reference to FIG. 13 how such drive pulses, comprising both positive and negative potential differences, can be created using positive-only potentials referenced to ground potential. Namely, first, positive drive pulses are applied to first actuator electrodes whilst their neighbouring electrodes are held at ground potential. Then, positive drive pulses are applied to the neighbouring actuator electrodes whilst the first actuator electrodes are held at ground potential. US2009/0073207A1 discloses using such positive-only drive pulses with ink jet printhead in which all chambers are ink-wetted.

The use of positive-only (or negative-only) drive pulses is particularly likely to lead to a potential difference between the average potentials of the array of liquid-wetted electrodes on a piezoelectric ink jet printhead and liquid-wetted metallic support components greater than the threshold overpotential. Further, according to U.S. Pat. Nos. 6,106,092A, 6,193,343B1, and US2009/0073207A1 the duration of the negative potential differences between adjacent liquid-wetted electrodes is approximately twice as long as the duration of the positive potential differences whilst their magnitude is the same. The magnitude of the average potential difference between adjacent liquid-wetted electrodes during trains of pulses (such as those shown in FIG. 5 of U.S. Pat. No. 6,106,092A) is therefore non-zero. In either case, electrochemical corrosion therefore results if any dielectric overcoat layers on the electrodes have pinholes or other imperfections. To avoid such corrosion, only substantially non-conducting liquids can be used.

Another example of printheads is inkjet heads in the form of Micro-Electro-Mechanical Systems (MEMS) such as those described in EP0511376B1. In these inkjet printheads, the material adjacent to the ink solution is silicon, and its electrical conductivity is such as to enable passing of electrical currents from the electrodes to the ink. Thus, the silicon material acts as a conductor in this context. The enabled electrical currents can however cause undesirable electrochemical redox reactions.

Therefore, there is currently a need for an improved method and apparatus for supplying electrical energy, power, or signals to devices whose operation requires transmission of electrical energy, power, or signals through electrical conductors that are proximal to, in contact with, or pass through an electrolyte solution environment. In particular, it is desirable to suppress or fully avoid irreversible reactions that may occur on the surface of one or more conductors as a result of an electrical charge flow from the conductor(s) into the electrolyte solution. More specifically, it is desirable to prevent or reduce the irreversible degradation of the conductors that may be caused by the ionisation and dissolution of the conductor (such as a metal electrode) into the electrolyte solution, or the break-up of the metal surface as the oxide layer grows deeper into the anode structure. For example, it is desirable to prevent the creation of hydrogen bubbles at the cathode and the irreversible oxidation of the metal electrode at the anode.

SUMMARY

According to a first aspect of the present invention there is provided a system for controlling supply of electrical energy from at least one power source through a plurality of electrical conductors adjacent to a common electrolyte solution, the system comprising: circuitry configured to control the at least one power source to apply a first potential difference waveform between a first pair of electrical conductors from the plurality of electrical conductors; and a capacitor coupling a first electrical conductor in the first pair to the at least one power source, wherein, in use, the potential difference waveform has a magnitude that exceeds a threshold overpotential for the first pair of electrical conductors in the electrolyte solution whilst a sum of (i) an absolute value of a potential difference across a double layer associated with the first electrical conductor and (ii) an absolute value of a potential difference across a double layer associated with a second electrical conductor in the first pair is maintained below the threshold overpotential.

By maintaining the sum of absolute values of potential differences across the double layers associated with the electrical conductors in such pairs below a threshold overpotential for the pair of electrical conductors in the electrolyte solution, the net charge injected into the electrolyte solution from the electrical conductors may be held close to zero. In this manner, electrochemical reactions that could result in (i) irreversible degradation of the electrical conductors, (ii) electrochemical degradation of the electrolyte solution, (iii) reduction in system performance, or (iv) reduction in system reliability and repeatability due to the proximity of the electrodes to the electrolyte solution and that typically occur in the known systems, such as the systems described in the Background section, are significantly suppressed or fully avoided.

Further, by connecting the first electrical conductor to the at least one power source through a capacitor it is possible to transmit the edges of potential difference waveforms between the pair of electrical conductors whilst filtering out low frequency components of those waveforms.

In some example embodiments, the system further comprises a second capacitor coupling the second electrical conductor to the at least one power source. By connecting both electrical conductors through respective capacitors it is possible to isolate electrically the potential difference waveforms applied between that first pair of conductors from the potentials of other conductors whilst still transmitting the edges of potential difference waveforms between the first pair of electrical conductors.

In some example embodiments, the circuitry is further configured to control the at least one power source to apply a second potential difference waveform between a second pair of electrical conductors from the plurality of electrical conductors and the system further comprises: a third capacitor coupling a third electrical conductor in the second pair to the at least one power source, wherein, in use, the second potential difference waveform has a magnitude that exceeds a threshold overpotential for the second pair of electrical conductors in the electrolyte solution whilst a sum of (i) an absolute value of a potential difference across a double layer associated with the third electrical conductor and (ii) an absolute value of a potential difference across a double layer associated with a fourth electrical conductor in the second pair is maintained below the threshold overpotential for the second pair.

In some example embodiments, when the system is in use, the magnitude of the first potential difference waveform and the magnitude of the second potential difference waveform exceed the smallest of the threshold overpotential for the first pair of electrical conductors and the threshold overpotential for the second pair of electrical conductors.

In some example embodiments, when the system is in use, the sum of the absolute values for the first pair of electrical conductors and the sum of the absolute values for the second pair of electrical conductors are maintained below the smallest of the threshold overpotential for the second pair and the threshold overpotential for the first pair.

In some example embodiments, the first pair of electrical conductors and the second pair of electrical conductors have a common electrical conductor.

In some example embodiments, the system further comprises a fourth capacitor coupling the fourth electrical conductor to the at least one power source.

In some example embodiments, for each of the plurality of electrical conductors, a respective capacitor couples the electrical conductor to the at least one power source.

In some example embodiments, the system further comprises a first resistor coupling the first electrical conductor and a control voltage source, the first resistor configured, in use, to discharge potential difference between the first electrical conductor and the control voltage source. Coupling the first electrical conductor to a control voltage source via the first resistor is particularly advantageous when the electrical load presented by those conductor pairs to the electrical power source system is capacitive because it provides a route to discharge the first electrical conductor to a control voltage source.

In some example embodiments, the system further comprises one or more resistors respectively coupling one or more of the plurality of electrical conductors to the control voltage source, each of the one or more resistors configured, in use, to discharge potential difference between the respective electrical conductor and the control voltage source.

In some example embodiments, each of the one or more electrical conductors is coupled to the at least one power source by a corresponding capacitor.

In some example embodiments, a first resistor and a second resistor coupled together, the first resistor coupled to the first electrical conductor and the second resistor coupled to the second electrical conductor, the first and second resistors configured, in use, to discharge potential difference between the first and second electrical conductors. By coupling both electrical conductors in the pair to respective resistors, it enables a wide range of potential difference waveforms that maintain the sum of the absolute values of the potential differences between the pair of conductors adjacent to the electrolyte solution and their corresponding layers of counter charge adjacent to those conductors at a level that is lower than the threshold overpotential.

In some example embodiments, the system further comprises a control voltage source coupling the first and second resistors, the first and second resistors further configured, in use, to discharge potential difference between the first and second electrical conductors and the control voltage source. By coupling the first and second resistors to the control voltage source, electrochemical reactions can be significantly suppressed or fully avoided in the case where there is a further conductor adjacent to the electrolyte whose potential otherwise would be such that there was a potential difference greater than the threshold overpotential between that further conductor and the common conductor coupling the first and second resistors.

In some example embodiments, at least one resistor is coupled respectively to at least one other of the plurality of electrical conductors and to the first and second resistors.

In some example embodiments, each of the plurality of electrical conductors that is coupled to a capacitor is coupled to a resistor such that the electrical conductor is connected to at least one further electrical conductor of the plurality of electrical conductors through the resistor and through at least one further resistor coupled to the further electrical conductor.

In some example embodiments, the system further comprises a control voltage source coupled to all resistors of the system.

In some example embodiments, the system is configured to supply electrical energy to a load.

In some example embodiments, the load comprises a plurality of piezoelectric actuators of a piezoelectric ink jet printhead According to a second aspect of the present invention there is provided a method of supplying energy from an electrical power source system having at least one power source through a plurality of electrical conductors adjacent to a common electrolyte solution, the method comprising: controlling the power source system to apply potential differences between electrical conductors in a first pair of electrical conductors selected from the plurality of electrical conductors to maintain a sum of (i) an absolute value of a potential difference across a double layer associated with a first electrical conductor in the first pair and (ii) an absolute value of a potential difference across a double layer associated with a second electrical conductor in the first pair below a threshold overpotential for the first pair of electrical conductors in the electrolyte solution.

In some example embodiments, a magnitude of at least one of the applied potential differences exceeds one and a half times the threshold overpotential for the first pair of electrical conductors for a period shorter than a shortest of double layer charging times associated with the first pair of electrical conductors, wherein a double layer charging time is a time constant characterising charging of a double layer associated with an electrical conductor adjacent to an electrolyte solution.

A double layer charging time is a time constant characterising charging of a double layer associated with an electrical conductor adjacent to an electrolyte solution. By applying the potential differences between the electrical conductors in the pair, the net charge injected into the electrolyte solution from those electrical conductors may be held close to zero, resulting in improvements in the efficiency of electrical energy/signals/power supply, prevention of irreversible degradation of the electrodes, reduction in electrochemical degradation of the ink, maintenance of system performance and improved reliability and repeatability.

In some example embodiments, the potential differences, applied between the electrical conductors in the first pair, are characterised by a first waveform comprising a plurality of sub-waveforms of finite duration.

In some example embodiments, at least two of the plurality of sub-waveforms are different.

In some example embodiments, the first waveform comprises a sub-waveform repeated at least once.

In some example embodiments, the plurality of sub-waveforms comprises one or more of a sine waveform, a square waveform, a rectangular waveform, a trapezoidal waveform, or a triangular waveform.

In some example embodiments, the plurality of the sub-waveforms comprises one or more of a waveform of positive potential difference, a waveform of negative potential difference, or both.

In some example embodiments, controlling the power source system to apply potential differences between electrical conductors in the first pair comprises: controlling the at least one power source to apply a first potential difference waveform between the first and second electrical conductors in the first pair, the first potential difference waveform having a magnitude that exceeds the threshold overpotential for the first pair of electrical conductors, wherein the electrical energy is supplied to the first pair of electrical conductors through a first capacitor coupling the first electrical conductor in the first pair to the at least one power source.

In some example embodiments, the electrical energy is supplied to the first pair of electrical conductors through the first capacitor and a second capacitor coupling the second electrical conductor in the first pair to the power source.

In some example embodiments, the method further comprises: controlling the power source system to apply potential differences between electrical conductors in a second pair of electrical conductors selected from the plurality of electrical conductors to maintain a sum of (i) an absolute value of a potential difference across a double a first electrical conductor in the second pair and (ii) an absolute value of a potential difference across a double a second electrical conductor in the second pair below a threshold overpotential for the second pair of electrical conductors in the electrolyte solution.

In some example embodiments, controlling the power source system to apply potential differences between electrical conductors in the second pair comprises: controlling the at least one power source to apply a second potential difference waveform between the first and second electrical conductors in the second pair, the second potential difference waveform having a magnitude that exceeds the threshold overpotential for the second pair of electrical conductors, wherein the electrical energy is supplied to the second pair of electrical conductors through a third capacitor coupling the first electrical conductor in the second pair to the power source.

In some example embodiments, the magnitude of the first potential difference waveform and the magnitude of the second potential difference waveform exceed the smallest of the threshold overpotential for the first pair of electrical conductors and the threshold overpotential for the second pair of electrical conductors.

In some example embodiments, the sum of the absolute values for the first pair of electrical conductors and the sum of the absolute values for the second pair of electrical conductors are maintained below the smallest of the threshold overpotential for the second pair and the threshold overpotential for the first pair.

In some example embodiments, the electrical energy is supplied to the second pair through the third capacitor and a fourth capacitor coupling the second electrical conductor in the second pair to the at least one power source In some example embodiments, the first pair of electrical conductors and the second pair of electrical conductors have a common electrical conductor.

In some example embodiments, the electrical energy is supplied to each of the plurality of electrical conductors through at least one capacitor coupling one or both electrical conductors in the pair to the at least one power source.

In some example embodiments, the method further comprises discharging potential difference between the first electrical conductor in the first pair and a control voltage source using a first resistor coupling the first electrical conductor in the first pair and the control voltage source.

In some example embodiments, the method further comprises discharging potential difference between the first and second electrical conductors in the first pair using first and second resistors coupled together and respectively to the first and second electrical conductors in the first pair.

In some example embodiments, the method further comprises discharging potential difference between the first and second electrical conductors in the first pair and a control voltage source using the first and second resistors coupled to the control voltage source.

In some example embodiments, the method further comprises using a plurality of resistors connected to a common electrical conductor to discharge potential difference between electrical conductors in pairs formed from the plurality of electrical conductors and connected to the power source system through respective capacitors, wherein each of the plurality of electrical conductors that is coupled to the respective capacitor is coupled to a respective resistor of the plurality of resistors such that the electrical conductor is connected to at least one further electrical conductor of the plurality of electrical conductors through the resistor and through at least one further resistor coupled to the further electrical conductor.

In some example embodiments, a magnitude of at least one of the applied potential differences exceeds one and a half times the threshold overpotential for the first pair of electrical conductors for a period shorter than a shortest of double layer charging times associated with the first pair of electrical conductors, wherein a double layer charging time is a time constant characterising charging of a double layer associated with an electrical conductor adjacent to an electrolyte solution.

In some example embodiments, the electrical energy from the at least one power source is supplied through the plurality of electrical conductors to a load.

In some example embodiments, the load is a plurality of piezoelectric actuators of a piezoelectric ink jet printhead.

In some example embodiments, an average potential difference of the potential differences applied between the electrical conductors in the first pair is smaller than the threshold overpotential for the first pair of electrical conductors, wherein the average potential difference is calculated over a time interval of the first waveform that is equal to or greater than the shortest double layer charging time associated with the first pair of electrical conductors.

In some example embodiments, the first waveform has no frequency component below 500 Hz whose magnitude exceeds the threshold overpotential.

In some example embodiments, the potential differences applied to the electrical conductors in the first pair comprise a plurality of voltage pulses, wherein each next of the plurality of voltage pulses is separated from a previous of the plurality of voltage pulses by a respective time interval.

In some example embodiments, each of the plurality of voltage pulses has duration shorter than 1 ms.

In some example embodiments, a potential difference below the threshold overpotential for the first pair of electrical conductors is applied between the electrical conductors in the first pair during one or more time intervals separating the voltage pulses in the plurality of voltage pulses.

In some example embodiments, a potential difference below the threshold overpotential for the first pair in the electrolyte solution is applied between the electrical conductors in the first pair during each time interval separating voltage pulses in the plurality of voltage pulses.

In some example embodiments, the plurality of voltage pulses comprises one or more voltage pulses of positive polarity, one or more voltage pulses of negative polarity, or any combination thereof.

In some example embodiments, a magnitude of at least one of the applied potential differences exceeds ten times the threshold overpotential for the first pair of electrical conductors for a period shorter than one tenth of the shortest of the double layer charging times associated with the first pair of electrical conductors.

In some example embodiments, a magnitude of at least one of the applied potential differences exceeds fifty times the threshold overpotential for the first pair of electrical conductors for a period shorter than one fiftieth of the shortest of the double layer charging times associated with the first pair of electrical conductors.

In some example embodiments, the method further comprises controlling the power source system to apply potential differences between electrical conductors in a second pair of electrical conductors selected from the plurality of electrical conductors to maintain a sum of (i) an absolute value of a potential difference across a double layer associated with a first electrical conductor in the second pair and (ii) an absolute value of a potential difference across a double layer associated with a second electrical conductor in the second pair below a threshold overpotential for the second pair of electrical conductors in the electrolyte solution.

In some example embodiments, a magnitude of at least one of the potential differences applied between the electrical conductors in the second pair exceeds the threshold overpotential for the second pair of electrical conductors for a period shorter than a shortest of double layer charging times associated with the second pair of electrical conductors.

In some example embodiments, the potential differences applied between the electrical conductors in the second pair are characterised by a waveform that characterises the potential differences applied between the electrical conductors in the first pair.

In some example embodiments, the potential differences applied between the electrical conductors in the second pair are characterised by a second waveform comprising a plurality of sub-waveforms of finite duration, wherein the second waveform is different from a waveform that characterises the potential differences applied between the electrical conductors in the first pair.

In some example embodiments, at least two of the plurality of sub-waveforms of the second waveform are different.

In some example embodiments, the second waveform comprises a sub-waveform repeated at least once.

In some example embodiments, the plurality of sub-waveforms of the second waveform comprises one or more of a sine waveform, a square waveform, a rectangular waveform, a trapezoidal waveform, or a triangular waveform.

In some example embodiments, an average potential difference of the potential differences applied between the electrical conductors in the second pair of electrical conductors is smaller than the threshold overpotential for the second pair of electrical conductors. The average potential difference is calculated over a time interval of the second waveform that is equal to or greater than the shortest double layer charging time associated with the second pair of electrical conductors.

In some example embodiments, the second waveform has no frequency component below 500 Hz whose magnitude exceeds the threshold overpotential for the second pair.

In some example embodiments, the potential differences applied to the electrical conductors in the second pair of electrical conductors comprise a second plurality of voltage pulses, and each next of the second plurality of voltage pulses is separated from a previous of the second plurality of voltage pulses by a respective time interval.

In some example embodiments, each of the second plurality of voltage pulses has duration shorter than 1 ms.

In some example embodiments, a potential difference below the threshold overpotential for the second pair of electrical conductors is applied between the electrical conductors in the second pair of electrical conductors during one or more time intervals separating the voltage pulses in the second plurality of voltage pulses.

In some example embodiments, a potential difference below the threshold overpotential for the second pair of electrical conductors is applied between the electrical conductors in the second pair during each time interval separating voltage pulses in the second plurality of voltage pulses.

In some example embodiments, the second plurality of voltage pulses comprises one or more voltage pulses of positive polarity, one or more voltage pulses of negative polarity, or any combination thereof.

In some example embodiments, a magnitude of at least one of the potential differences applied between the electrical conductors in the second pair exceeds ten times the threshold overpotential for the second pair of electrical conductors for a period shorter than one tenth of the shortest of the double layer charging times associated with the second pair of electrical conductors.

In some example embodiments, a magnitude of at least one of the potential differences applied between the electrical conductors in the second pair exceeds fifty times the threshold overpotential for the second pair of electrical conductors for a period shorter than one fiftieth of the shortest of the double layer charging times associated with the second pair of electrical conductors.

In some example embodiments, at least one electrical conductor is common to the first and second pairs of electrical conductors.

In some example embodiments, the electrical conductors of the first pair are different from the electrical conductors of the second pair.

In some example embodiments, the potential differences are respectively applied between the electrical conductors of the first and second pairs simultaneously.

In some example embodiments, whilst a potential difference is applied between the electrical conductors in the first pair, no potential difference is applied between the electrical conductors in the second pair.

In some example embodiments, each of (i) the sum of the absolute values of the potential differences across the double layers associated respectively with the electrical conductors in the first pair and (ii) the sum of the absolute values of the potential differences across the double layers associated respectively with the electrical conductors in the second pair is maintained below a smallest of the threshold overpotential for the first pair of electrical conductors and the threshold overpotential for the second pair of electrical conductors.

In some example embodiments, the sum of the absolute values of the potential differences across the double layers associated respectively with the electrical conductors in the first pair is maintained below an absolute value of a smallest of potential differences between any of the plurality of electrical conductors that cause an electrolyte current to flow from one member of the pair to the other member of the pair through the electrolyte solution between the electrical conductors.

In some example embodiments, each of (i) the sum of the absolute values of the potential differences across the double layers associated respectively with the electrical conductors in the first pair and (ii) the sum of the absolute values of the potential differences across the double layers associated respectively with the electrical conductors in the second pair is maintained below an absolute value of a smallest of potential differences between any of the plurality of electrical conductors that cause an electrolyte current to flow from any member of the plurality of electrical conductors to any other member of the plurality of electrical conductors through the electrolyte solution between the electrical conductors.

According to a third aspect of the present invention, there is provided a method of ejecting electrolyte droplets, the method comprising: supplying energy in accordance with any of the methods of supplying energy, as described herein, through one or more first pairs of electrical conductors, selected from the plurality of electrical conductors, to one or more first actuators associated with the one or more first pairs of electrical conductors to cause ejection of one or more droplets of the electrolyte solution from at least one of one or more chambers housing the electrolyte solution, wherein each of the one or more first actuators is configured to cause ejection of a droplet from the at least one chamber upon reaching a respective displacement level.

In some example embodiments, the method of ejecting electrolyte droplets further comprises one or more of: (a) controlling the power source system to apply between one or more second pairs of electrical conductors, selected from the plurality of electrical conductors and associated with one or more second actuators, a first series of voltage pulses to maintain an average potential difference between (i) any one of the electrical conductors associated with the one or more first actuators and (ii) any one of the electrical conductors associated with the one or more second actuators below a smallest of threshold overpotentials associated with the one or more second pairs of electrical conductors, wherein the average potential difference is calculated over a time interval equal to or greater than a shortest double layer charging time associated with the electrical conductors in the first and second pairs, and a duration of each voltage pulse is sufficiently short to prevent each of the one or more second actuators from reaching the respective displacement level; (b) controlling the power source system to apply substantially the same potential simultaneously to two adjacent of the electrical conductors associated with the one or more second actuators; or (c) controlling the power source system to apply, between one or more third pairs of electrical conductors, selected from the plurality of electrical conductors and associated with one or more second actuators, a second series of voltage pulses to maintain the average potential difference between (i) any one of the electrical conductors associated with the one or more first actuators and (ii) any one of the electrical conductors associated with the one or more second actuators below a smallest threshold overpotential associated with the one or more third pairs of electrical conductors, wherein the voltage pulses of the second series are characterised by one or more waveforms having rise times and fall times sufficiently long that a pressure rise thereby induced in the electrolyte solution by the one or more second actuators is insufficient to cause ejection of the electrolyte solution as droplets.

In some example embodiments, the method of ejecting electrolyte droplets further comprises controlling the power source system to apply a potential difference between (i) one or more of the electrical conductors associated with the first or second actuators and (ii) at least one of one or more conducting components adjacent to the electrolyte solution to maintain an average potential difference between (a) any one of the one or more electrical conductors associated with the one or more first actuators or second actuators and (b) any one of the one or more conducting components below a smallest of threshold overpotentials associated with the plurality of electrical conductors and the one or more conducting components, wherein the average potential difference is calculated over a time period equal to or greater than a shortest double layer charging time associated with any of the plurality of electrical conductors and the one or more conducting components that are adjacent to the electrolyte solution.

In some example embodiments, controlling the power source system to apply a potential difference between (i) the one or more of the electrical conductors associated with the first and second actuators and (ii) the at least one conducting component adjacent to the electrolyte solution comprises: controlling, based on reference data concerning an average potential with respect to ground potential of the electrical conductors associated with the first and second actuators with respect to ground potential, the power source system to apply a series of voltage pulses between the at least one conducting component and ground potential to reduce a difference between a potential of the at least one conducting component and the average potential with respect to ground potential of the electrical conductors associated with the first and second actuators, wherein the difference between the potential of the at least one conducting component and the average potential with respect to ground potential of the electrical conductors associated with the first and second actuators is calculated over a time interval equal to or greater than a shortest of double layer charging times associated with the electrical conductors in the first and second pairs and the at least one conducting component.

In some example embodiments, the reference data is maintained at a reference electrical conductor associated with the power source system and electrically shielded from the electrolyte solution, and the method further comprises: controlling the potential of the reference electrical conductor with respect to ground potential to the average potential with respect to ground potential of the electrical conductors associated with the first and second actuators.

In some example embodiments, controlling the potential of the reference electrical conductor with respect to ground potential equal to the average potential with respect to ground potential comprises: determining the average potential with respect to ground potential of the electrical conductors associated with the first and second actuators based on time averaged potentials with respect to ground potential of the electrical conductors associated with the first and second actuators; and controlling the power source system to apply the determined average potential with respect to ground potential to the reference electrical conductor.

In some example embodiments, the average potential with respect to ground potential of the electrical conductors associated with the first and second actuators is pre-determined based on pre-set waveforms characterising the potential differences with respect to ground potential applied to the electrical conductors associated with the first and second actuators.

In some example embodiments, the average potential with respect to ground potential of the electrical conductors associated with the first and second actuators is determined and updated in real time based on running time averaged potentials with respect to ground potential of the electrical conductors associated with the first and second actuators.

In some example embodiments, the one or more conducting components are held to ground potential.

In some example embodiments, at least some of the plurality of electrical conductors comprise, at least for a portion of their respective lengths, actuator electrodes for supplying electrical energy to the respective actuators.

In some example embodiments, the plurality of electrical conductors comprises one or more of: an insulated electrical conductor, a partially-insulated electrical conductor, or a non-insulated electrical conductor.

In some example embodiments, the plurality of electrical conductors comprises one or more of: an electrical conductor fully immersed in the electrolyte solution or an electrical conductor partially immersed in the electrolyte solution.

According to a fourth aspect of the present invention, there is provided a device comprising an electronic circuitry configured to control supply of energy from the electrical power source system through the plurality of electrical conductors adjacent to the electrolyte solution in accordance with any of the methods of supplying energy, as described herein.

According to a fifth aspect of the present invention, there is provided a device comprising an electronic circuitry configured to control ejection of electrolyte droplets from the electrolyte solution in accordance with any of the methods of ejecting electrolyte droplets, as described herein.

According to a sixth aspect of the present invention, there is provided a system for a printhead, the system comprising: an electronic circuitry configured to control ejection of electrolyte droplets from the electrolyte solution in accordance with any of the methods of ejecting electrolyte droplets, as described herein, wherein the plurality of electrical conductors comprises actuator electrodes of the printhead. The system further comprises a reference electrical conductor, electrically shielded from the electrolyte solution, the reference electrical conductor configured to maintain reference data concerning average potentials with respect to ground potential of the actuator electrodes of the printhead and make the reference data available to the electronic circuitry.

According to a seventh aspect of the present invention, there is provided a storage medium (e.g., non-transitory storage medium) comprising instructions stored therein, which, when executed, cause a processor to perform any of the methods of ejecting electrolyte droplets described above.

According to an eighth aspect of the present invention, there is provided a storage medium (e.g., non-transitory storage medium) comprising instructions stored therein, which, when executed by a processor, cause a processor to perform any of the methods of supplying energy described above.

According to a ninth aspect of the present invention, there is provided a system comprising one or more processors and memory comprising instructions which, when executed by the one or more processors, cause the system to carry out any of the methods of supplying energy described above.

According to a tenth aspect of the present invention, there is provided a system comprising one or more processors and memory comprising instructions which, when executed by the one or more processors, cause the system to carry out any of the methods of ejecting electrolyte droplets described above.

Thus, as will be appreciated by those skilled in the art, the present invention provides improved and versatile methods, systems, and devices for supplying electrical energy, power, or signals to devices whose operation requires transmission of such electrical energy, power, or signals through electrical conductors that are adjacent to an electrolyte solution such that electrochemical reactions that could cause irreversible degradation of conductors involved in the transmission and in electrical contact with the electrolyte solution are significantly suppressed or avoided. Further variations and embellishments will become apparent to the skilled person in light of this disclosure.

BRIEF DESCRIPTION OF DRAWINGS

Examples of the present invention will now be described in detail with reference to the accompanying drawings, in which:

FIGS. 17A and 17B show a graph of potential difference resulting from the circuit shown in FIG. 16;

DETAILED DESCRIPTION

Various techniques disclosed herein are directed to enabling supply of electrical energy, power, or signals to various devices, whose operation requires supply of the electrical energy, power, or signals through a plurality of electrical conductors adjacent to an electrolyte solution. In the context of positioning of an electrical conductor in relation to the electrolyte solution, the term "adjacent to" generally means being close to or in direct contact with the electrolyte solution and includes the following scenarios: a conductor, whether uncoated or coated with any combination of a semiconducting, dielectric or insulating layer, touches (contacts) the electrolyte solution, is partially immersed into the electrolyte solution (with one end, both ends, some other portion of the conductor, and alike), fully immersed into the electrolyte solution, or is sufficiently close to the electrolyte solution such that application of a certain potential difference between that and another conductor adjacent to the electrolyte solution can cause a current to flow through the electrolyte solution. In this context, examples of insulating layers include, but are not limited to, layers made of soft polymeric materials such as Parylene, or hard materials such as silicon nitride ($Si_3N_4$), or piezoelectric materials, or gaseous materials such as air. In the context of this disclosure, similar meaning should be accorded to the term "adjacent to" when it is used to describe positioning of other components in relation to the electrolyte solution.

Figure 1:
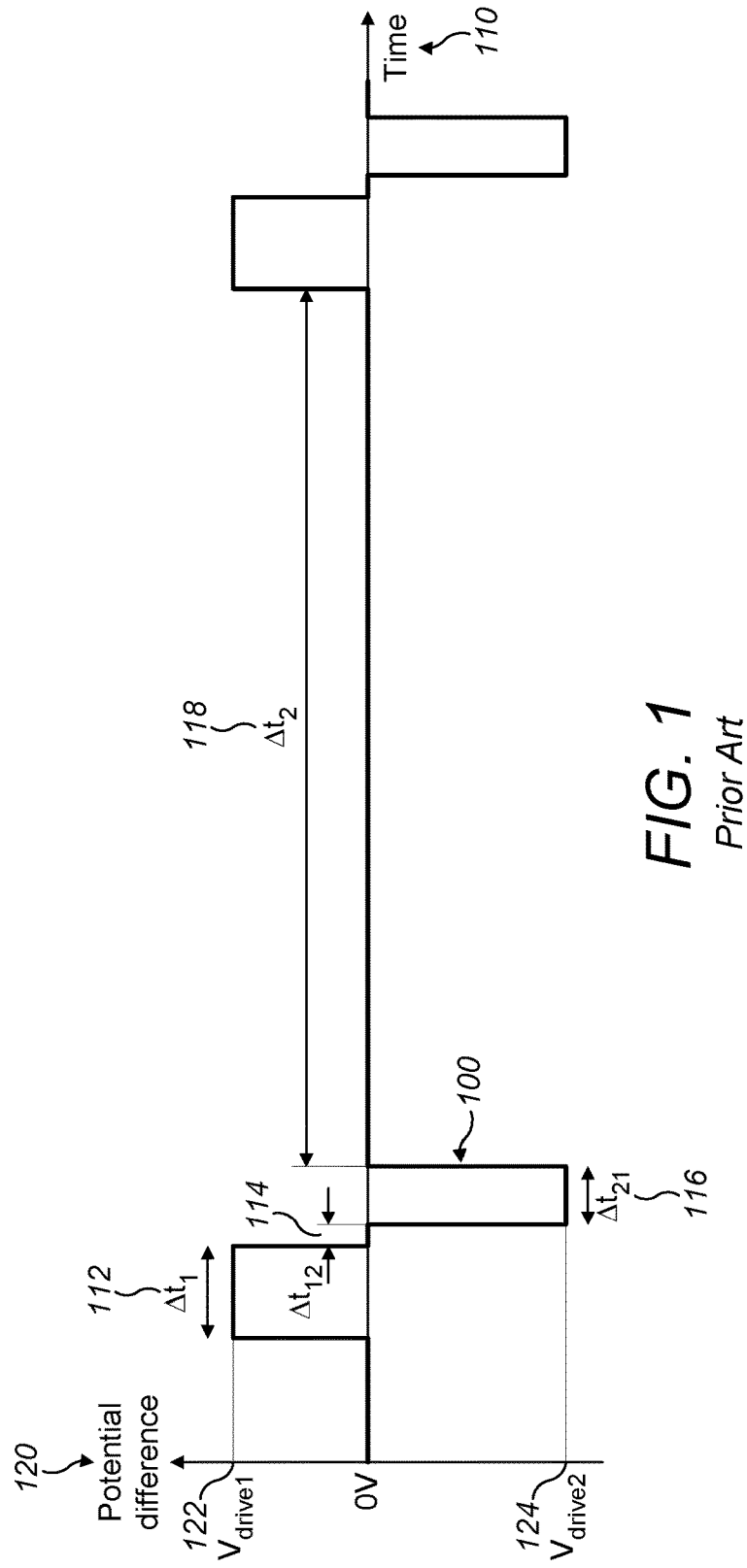
FIG. 1 is a schematic diagram of known potential difference waveforms used in piezoelectric shared wall printheads.

Reference is now made to FIG. 1, which illustrates potential difference waveforms of the general nature, such as the waveforms described in the Background section with reference to known piezoelectric ink jet printheads; in which such waveforms are used to supply electrical energy to piezoelectric actuators within those printheads. In such printheads, the potential difference waveforms of magnitudes $V_{drive\ 1}$ and $V_{drive\ 2}$, such as a waveform 100 shown in FIG. 1 depicting changes in potential difference 120 over time 110, may be provided either by applying to the actuator electrodes positive and negative potentials referenced to ground potential, or by applying to the actuator electrodes positive-only or negative-only potentials referenced to ground potential. Depending on timings $\Delta t_1$, $\Delta t_{12}$, $\Delta t_{21}$, and $\Delta t_2$ (identified respectively by reference numerals 112, 114, 116, and 118), the magnitudes $V_{drive\ 1}$ and $V_{drive\ 2}$ (identified respectively by reference numerals 122 and 124) and the combination of actuator electrodes to which voltages are applied, the average potential difference between such liquid-immersed electrodes may be greater than the threshold overpotential, $V_{op}$. If that average potential difference is greater than the threshold overpotential $V_{op}$ over a sufficiently long timescale, electrochemical corrosion of the electrodes, electro-chemical degradation of the ink, and other issues will also occur.

In addition, the piezoelectric ink jet printheads may contain remote, non-driven electrodes such as mechanical support components or liquid supply components that are also immersed in the liquid. Depending on the timings $\Delta t_1$, $\Delta t_{12}$, $\Delta t_{21}$, and $\Delta t_2$, the magnitudes $V_{drive\ 1}$ and $V_{drive\ 2}$, and the combination of the actuator electrodes to which voltages are applied, the average potential difference between any actuator electrode and any other actuator electrode or a remote electrode immersed in the liquid may be greater than the threshold overpotential $V_{op}$. For certain printed patterns, such as all printhead actuators being operated equally (e.g. a solid printed block), the average potential difference between all actuator electrodes may be lesser than the threshold overpotential $V_{op}$. However, the assembly of actuator electrodes may present an average potential to remote electrodes or other conductors immersed in the liquid such that the potential difference between that average potential and the potential of any remote immersed conductor is greater than the threshold overpotential $V_{op}$.

If the potential difference between the average potential of any liquid-immersed electrode and any other liquid-immersed electrode is greater than the threshold overpotential $V_{op}$, and if that condition is maintained over a sufficiently long timescale, electrochemical corrosion will occur between such liquid-immersed electrodes, electro-chemical degradation of the ink, and other issues will also occur. Consequently, such printheads are conventionally restricted to the use of inks with a long timescale over which electrochemical corrosion occurs. Such inks are substantially non-conducting.

The methods and systems disclosed herein overcome the above described drawbacks of the conventional methods for supplying electrical energy through electrical conductors adjacent to an electrolyte solution by providing methods and systems according to which a potential difference exceeding the threshold overpotential is applied between at least two conductors in accordance with a potential difference waveform that ensures that the sum of the absolute values of the potential differences between any pair of conductors adjacent to the electrolyte solution and their corresponding layers of counter charge adjacent to those conductors is maintained at a level that is lower than the threshold overpotential, where an electrical charge flows to and from those conductors responsive to the applied potential difference. In this manner, electrical energy, power, and/or signals can be provided through the at least two conductors to an electrical load to which those conductors are connected, whilst the net charge injected into the electrolyte solution from the electrical conductors may advantageously be held close to zero and electrochemical reactions that could result in irreversible degradation of the conductors adjacent to the electrolyte solution are substantially suppressed or fully avoided. As described below in greater detail, an electrical power source system (may also be referred to as a power supply system) can be used to supply electrical energy, power, or signals through the conductors adjacent to the common electrolyte solution in accordance with potential difference waveform(s).

In some embodiments, the power source system comprises one or more electrical power sources that provide potential difference waveform(s) of magnitude exceeding the threshold overpotential between those conductors and series capacitive coupling between the electrical power source(s) and each of those conductors. Application of the potential difference waveform(s) to pair(s) of electrical conductors causes charge to flow to and from the pairs of electrical conductors.

The capacitive coupling can be particularly useful when the one or more electrical power sources provide a potential difference waveform that is pulsatile in nature, when they effectively transmit pulse edges to the pairs of electrical conductors whilst filtering out any low frequency elements of the potential difference waveform. Where the electrical load presented by those conductor pairs to the electrical power source system is capacitive, preferably an electrical resistance is additionally provided between the junction made by each series capacitor with the conductor adjacent to the electrolyte solution to which that capacitor is connected and a common conductor.

As described below in greater detail, a judicious choice of (i) the capacitance of the series capacitive coupling, (ii) the resistance between the junction made by each series capacitor with the conductor adjacent to the electrolyte solution to which that capacitor is connected, and the common conductor enables a wide range of potential difference waveforms that allow to maintain the sum of the absolute values of the potential differences between any pair of conductors adjacent to the electrolyte solution and their corresponding layers of counter charge adjacent to those conductors at a level that is lower than the threshold overpotential. In this manner, electrical energy, power, and/or signals can be provided through the at least two conductors to an electrical load to which those conductors are connected whilst the net charge injected into the electrolyte solution from the electrical conductors may advantageously be held close to zero. Thus, electrochemical reactions that could result in irreversible degradation of the conductors adjacent to the electrolyte solution are further suppressed or fully avoided. In the case where there is a further conductor adjacent to the electrolyte that is held at a potential, (e.g. directly connected to ground) such electrochemical reactions could still occur. This can be prevented by connecting the common conductor to a control voltage $V_{control}$ selected to be within $V_{op}$ of the potential of that further conductor.

The suppression of electrochemical reactions achieved hereby significantly reduces the requirement for the insulating layers to provide perfect or near-perfect electrical insulation between the conductors and the electrolyte solution. In turn, the ease of fabrication and reliability of many conductor assemblies and devices whose operation requires transmission of electrical energy, power or signals through electrical conductors adjacent to electrolyte solutions, e.g., passing through, are improved.

Figure 2:
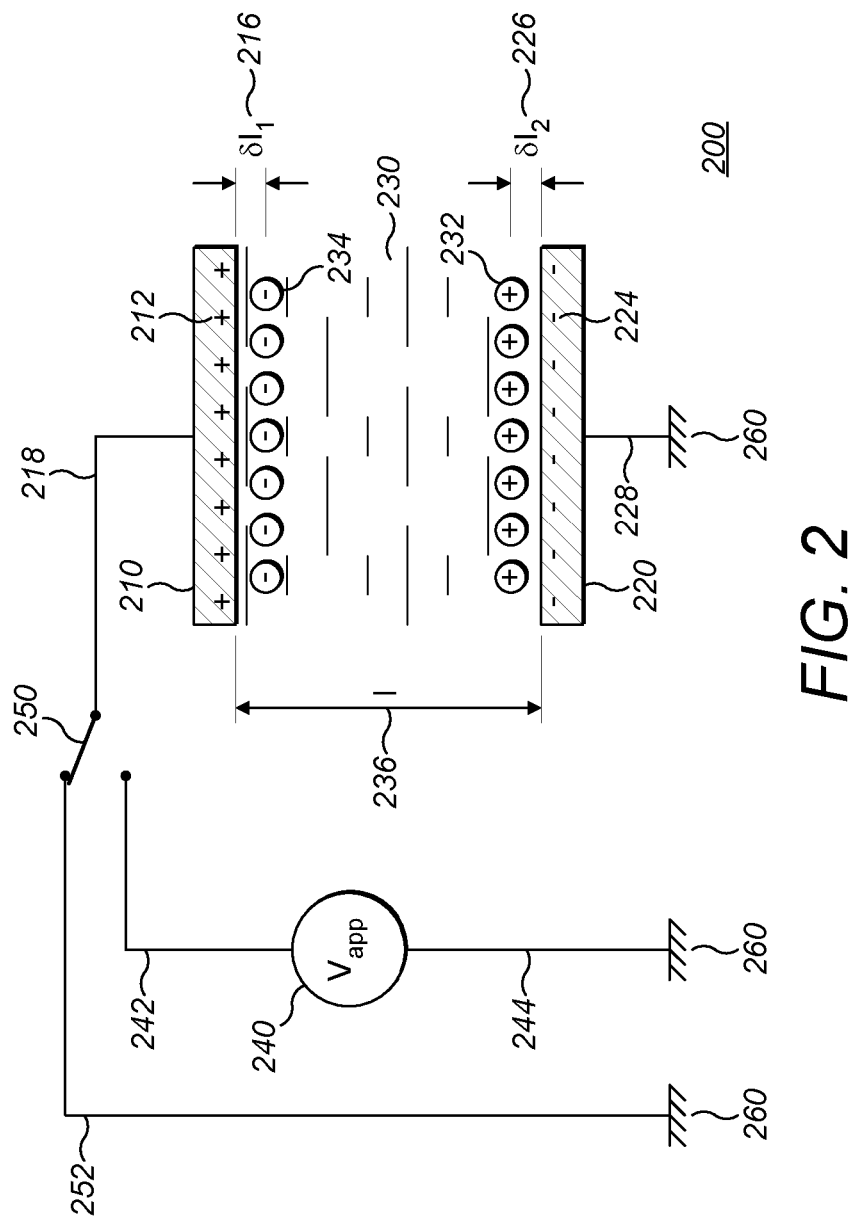
FIG. 2 is a schematic diagram of a double-layer charging process.

Reference is now made to FIG. 2, which depicts a schematic diagram of a double-layer charging process. To ease explanation of the principles of the invention, FIG. 2 depicts a simplified model 200 of the double-layer charging process. It should not be considered as limiting in respect of the described principles and techniques. Rather, the principles and techniques described herein are similarly applicable to more sophisticated models and the skilled person would appreciate how to extrapolate the disclosed principles and techniques to such more sophisticated models.

The model 200 includes two identical electrical conductors (e.g., electrodes) 210 and 220 placed apart at a distance/ (shown at 236) and an electrolyte solution 230 extending between and in contact with the electrodes 210 and 220. The electrolyte solution has dielectric permittivity $\varepsilon_r\varepsilon_0$, where $\varepsilon_0$ is the permittivity of vacuum and $\varepsilon_r$ is the relative permittivity of the electrolyte solution. The model 200 further includes a source 240 of potential difference (and electrical power), such as a Black Star Jupiter 2000 function generator, connected to one contact of an electrical switch 250 via electrical wiring 242 and to ground potential 260 (also referred to as 0V) via electrical wiring 244. The two other contacts of the switch 250 are respectively connected (i) to the electrode 210 via electrical wiring 218 and (ii) to ground potential 260 via electrical wiring 252. The electrode 220 is connected to ground potential 260 via electrical wiring 228.

As shown in FIG. 2, the switch 250 initially connects the electrode 210 to the ground potential 260 via the wiring 252. Consequently, initially there is no difference in potential or charge density between the electrodes 210 and 220. When the switch 250 is subsequently operated to connect the electrode 210 to the voltage source 240 via the wiring 242, the source 240 raises the potential of the electrode 210 above ground potential by voltage $V_{app}$ by transferring electrons from the electrode 210 to ground 260. The electrode 220 is electrically connected to ground and so its potential remains at 0 Volts. The potential difference $V_{app}$ (and consequential electric field), which is therefore produced between the electrodes 210 and 220, causes electron flow into the electrode 220 via the wiring 228. In this way, a positive charge density 212 arises on the electrolyte-contacting surface of the electrode 210 and a negative charge density 224 arises on the electrolyte-contacting surface of the electrode 220. The potential difference between the electrodes 210 and 220 causes ionic species 234 of negative charge to migrate towards the positively-charged electrode 210 and ionic species 232 of positive charge to migrate towards the negatively-charged electrode 220. The negative ionic species 234 and the positive charge density 212 on the electrolyte-contacted surface of electrode 210 form a double-layer of charge, separated by a characteristic separation $\delta l_1$ (shown at 216). This double layer of charge is denoted hereinafter as DL1. The positive ionic species 232 and the negative charge density 224 on the electrolyte-contacted surface of the electrode 220 form a double-layer of charge, separated by a characteristic separation $\delta l_2$ (shown at 226). This double layer of charge is denoted hereinafter as DL2.

In aqueous liquids, the characteristic separations $\delta l_1$ and $\delta l_2$ are both typically about 1 nm. Hereinafter, for simplicity of explanation, no distinction is generally made between the characteristic separations $\delta l_1$ and $\delta l_2$ and they are primarily referred to as $\delta l$, the flows of the respective ionic species responsive to the potential difference are viewed as being identical and characterised by a single resistivity $\rho$; and the charging of both double layers is viewed as being characterised by the same time constant denoted as a double layer charging time or $\tau_{DL}$. Taking into consideration these simplifications, the double layer charging time for each double layer can be expressed as follows:

$$\tau_{DL}=(\varepsilon_r\varepsilon_0\rho)\times(l/\delta l) \qquad (1).$$

Thus, for an aqueous liquid, for example, with a resistivity $\rho=10\ \Omega m$ and relative permittivity $\varepsilon_r=80$, and where two conductors (such as electrodes) are set apart at, for example, $l=100\ \mu m$, the double layer charging time is approximately 0.7 ms (the permittivity of vacuum $\varepsilon_0 \approx 8.854\times10^{-12}$ F/m). In practice, however, when the conductors are set apart at approximately 100 μm, most aqueous electrolyte solutions have a double layer charging time, $\tau_{DL}$, in the region of 1 ms.

Returning to the model 200, for the fully charged double layers, the absolute value of the potential difference between the negative surface charge of the ionic species 234 and the positive surface charge 212 on the electrode 210 is denoted as $\Delta V_{DL1}(max)$ and the absolute value of the equilibrium potential difference between the positive surface charge of the ionic species 232 and the negative surface charge 224 on the electrode 220 is denoted as $\Delta V_{DL2}(\max)$, $\Delta V_{DL1}(\max) < V_{app}$ and $\Delta V_{DL2}(\max) < V_{app}$. At a general time t, those double layers need not be fully charged. The absolute values of their potential differences at time t are denoted as $\Delta V_{DL1}(t)$ and $\Delta V_{DL2}(t)$ respectively. Within this model, the initial time-evolution of the potential differences $\Delta V_{DL1}(t)$ and $\Delta V_{DL2}(t)$ during charging may be described as follows:

$$\Delta V_{DL1}(t) = (V_{DL1}(\max))(1 - e^{-t/\tau DL}) \quad (2a)$$

and $$\Delta V_{DL2}(t) = (V_{DL2}(\max))(1 - e^{-t/\tau DL}) \quad (2b),$$

in which $\Delta V_{DL1}(\max) < V_{app}$ and $\Delta V_{DL2}(\max) < V_{app}$ and where t=0 signifies the point in time at which the switch 250 is operated to switch the electrical connection of the electrode 210 from a connection to ground potential via the wiring 252 to a connection to the voltage source 240 via the wiring 242. The double-layer charging time $T_{DL}$ may itself depend upon $V_{app}$, i.e., $\tau_{DL} \equiv \tau_{DL}(V_{app})$. To keep the notations disclosed herein simple, any such dependency is not expressly included in the equations described and, instead, is implicit.

Even if the potential applied to the electrode 210, and therefore the potential difference applied between the electrode 210 and the electrode 220, is greater than the overpotential ($V_{app} > V_{op}$), it takes a finite time $\Delta t$ for the sum, $\Delta V_{DL}(t)$, of the absolute values of both potential differences $\Delta V_{DL1}(t)$ and $\Delta V_{DL2}(t)$:

$$\Delta V_{DL}(t) = \Delta V_{DL1}(t) + \Delta V_{DL2}(t) \quad (3)$$

to rise from zero to a value exceeding $V_{op}$. Thus, a potential difference waveform of magnitude exceeding the threshold overpotential may be applied between at least two conductors (and thereby cause electrical charge flow to and from those conductors and hence supply electrical power, energy or signals through those conductors and to an electrical load connected to those conductors) whilst ensuring that the sum of the absolute values of the potential differences between any pair of conductors adjacent to the electrolyte solution and their corresponding layers of counter charge adjacent to those conductors is maintained at a level that is lower than the threshold overpotential.

For that time period $\Delta t$ during which $\Delta V_{DL}(t)$ remains smaller than $V_{op}$, the conditions enabling the occurrence of the irreversible reactions on the surface of the one or both electrodes will not be met. That is, there will be substantially no net charge flow into the electrolyte solution from the electrodes 210 and 220. Thus, if $V_{app}$ is applied only for a time period of $\delta t < \Delta t$ (this short-duration application of potential difference being termed a 'voltage pulse'), $\Delta V_{DL}(t)$ will remain smaller than $V_{op}$, the net charge flow into the electrolyte solution from the electrodes will remain substantially zero and no irreversible reactions should occur. Accordingly, the finite time $\Delta t$ required for $\Delta V_{DL}(t)$ to rise from zero to a value equal to $V_{op}$, and thus the maximum desired pulse duration $\delta t$, depend upon the applied potential difference $V_{app}$. These dependencies may respectively be described as $\Delta t(V_{app})$ and $\delta t(V_{app})$. As a guide, within this simplified model (as represented by equations (1), (2a), (2b), and (3), requiring $\Delta V_{DL}(t) < V_{op}$, in turn requires:
  (i) $\delta t < \tau_{DL}$ when $V_{app}$ is about $1.5 V_{op}$,
  (ii) $\delta t < 0.1 \tau_{DL}$ when $V_{app}$ is about $10 V_{op}$,
  (iii) $\delta t < 0.02 \tau_{DL}$ when $V_{app}$ is about $50 V_{op}$,
  etcetera.

Applying similar reasoning, a finite time characterised by $\tau_{DL}$ is required for $\Delta V_{DL}(t)$ to rise from some other potential difference, lesser than $V_{op}$, to a potential difference greater than $V_{op}$. This time governs the maximum duration of $\delta t$ if the condition $\Delta V_{DL}(t) < V_{op}$ is to be maintained.

This simplified scenario shows that potentials $V_{app} > V_{op}$ can be applied for short periods, and hence electrical energy, power, or signals can be transmitted, whilst the processes tending to cause electrode degradation and other electrochemical reactions can be suppressed or even avoided.

In practice, however, such systems are typically more complex than the described model. For example, the values of $\delta l_1$ and $\delta l_2$ may differ, as may the mobility, and hence resistivity, of different ionic species within the electrolyte. Therefore, in a more complex model, the charging of each double layer may need to be characterised by more than one single time constant.

However, in the context of this disclosure, the skilled person will appreciate how to extrapolate the disclosed principles and technique to such a more complex model. In particular, the overall approach will remain the same for more complex models since the need to charge the double layers remains and a potential difference $V_{app}$ exceeding the threshold overpotential $V_{op}$ should only be applied between the electrodes for a limited time period and in such a manner so as to maintain $\Delta V_{DL}(t) < V_{op}$. In this way, electrical energy, power, or signals can be supplied through electrical conductors adjacent to electrolyte solution environments at a potential difference $V_{app}$ exceeding the threshold overpotential $V_{op}$, whilst at the same time suppressing electrochemical reactions between those conductors and electrolyte.

The same approach is valid when a succession of voltage pulses $V_{app}$ is applied. Although the potential difference $\Delta V_{DL}(t)$ for each double layer may not have decayed to zero since the previous voltage pulse, it is still possible to supply a subsequent voltage pulse. In particular, since the potential difference $\Delta V_{DL}(t)$ requires a finite time to rise from some non-zero voltage value lesser than $V_{op}$ to a value greater than $V_{op}$, subsequent voltage pulse(s) of value $V_{app} > V_{op}$ may still be supplied for time period(s) sufficiently short for the potential difference value $\Delta V_{DL}(t)$ to remain lesser than $V_{op}$.

Figure 3A:
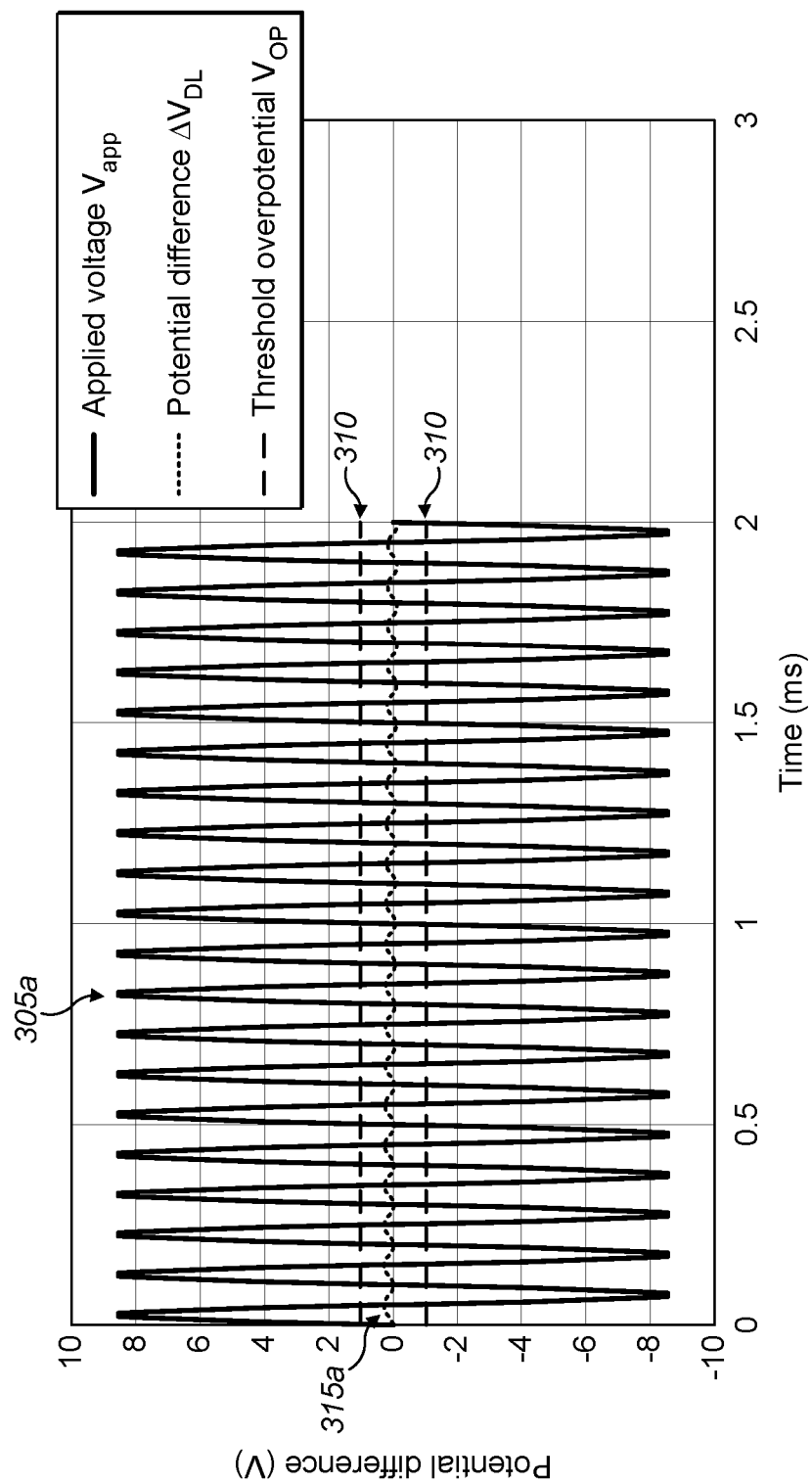
FIGS. 3A to 3E depict exemplary waveforms of potential difference suitable to be applied through electrical conductors adjacent to an electrolyte solution environment so as to prevent electrochemical corrosion in accordance with the disclosed methods.
Figure 3B:
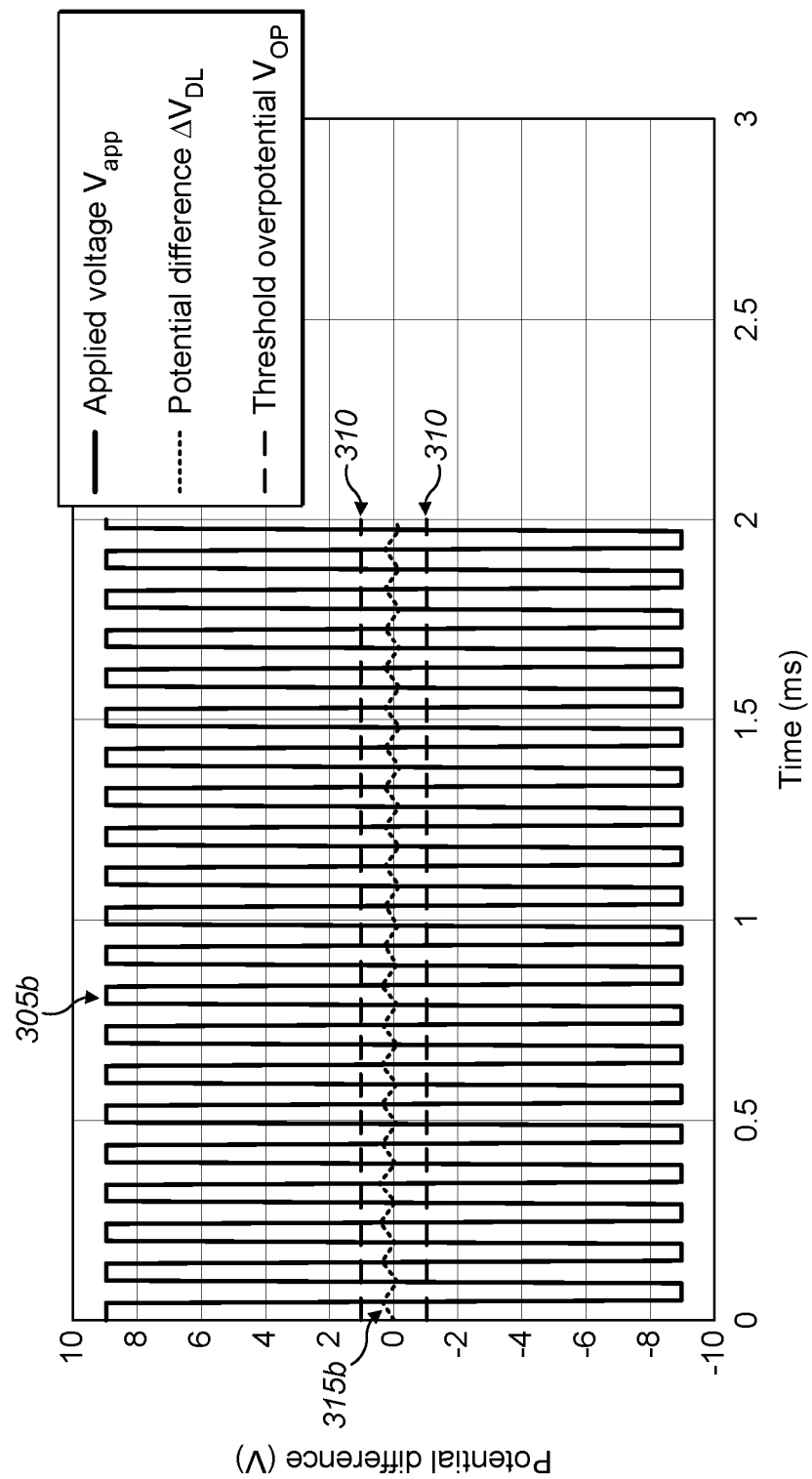

In many practical applications, such as powering underwater lights, a distance l larger than 100 μm is appropriate to separate electrical conductors in contact with or otherwise adjacent to an electrolyte solution, such as the electrodes 210 and 220. Consequently, for most aqueous liquids in such applications, the double layer charging period constant $\tau_{DL}$ is in the region of or larger than 1 ms. The potential difference waveforms that are suitable in many such aqueous applications include, but are not limited to, the following:
a) sinusoidal, square, and triangular voltage waveforms that have frequency 500 Hz or greater, and a net DC component smaller than the threshold overpotential;
b) waveforms comprising a single, or multiple successive, voltage pulse(s) of either or both polarities, with each voltage pulse being of a duration shorter than 1 ms (e.g., in the range of 1 ns to 500 μs) and separated from the previous or next voltage pulse by a period of duration of order of the pulse duration, during which the potential difference is close to zero and such that $\Delta V_{DL}(t)$ remains below $V_{op}$. Examples of such waveforms are shown in FIGS. 3A and 3B for the case where the waveforms 305a and 305b each have both polarities and in FIG. 3C for the case where the waveform 305c has a single polarity; and
c) short-duration voltage pulse waveforms of the type described above in respect of (b), in which the potential difference between pulses is non-zero but lower than the threshold overpotential $V_{op}$. An example of such a waveform is shown in FIG. 3D—waveform 305d.

FIGS. 3A to 3E show exemplary potential difference waveforms such that $\Delta V_{DL}(t)$, referenced in FIGS. 3A to 3E as 315a to 315e respectively, remains below $V_{op}$, referenced in FIGS. 3A to 3E as 310, which for illustration purposes is taken to be 1V. $\Delta V_{DL}(t)$ is calculated from equations (1), (2a), (2b) and (3), setting $T_{DL}$=1 ms and, in order to represent different applied voltage waveforms, allowing $V_{app}$ to be zero until time t=0 and to be a function of time $V_{app}(t)$ thereafter.

More specifically, FIG. 3A depicts a sinusoidal waveform 305a of the applied potential difference $V_{app}(t)$, with the amplitude of approximately 9V and frequency of 10 kHz. FIG. 3B depicts a square waveform 305b of the applied potential difference $V_{app}(t)$, with the amplitude of 9V and frequency of 10 kHz.

Figure 3C:
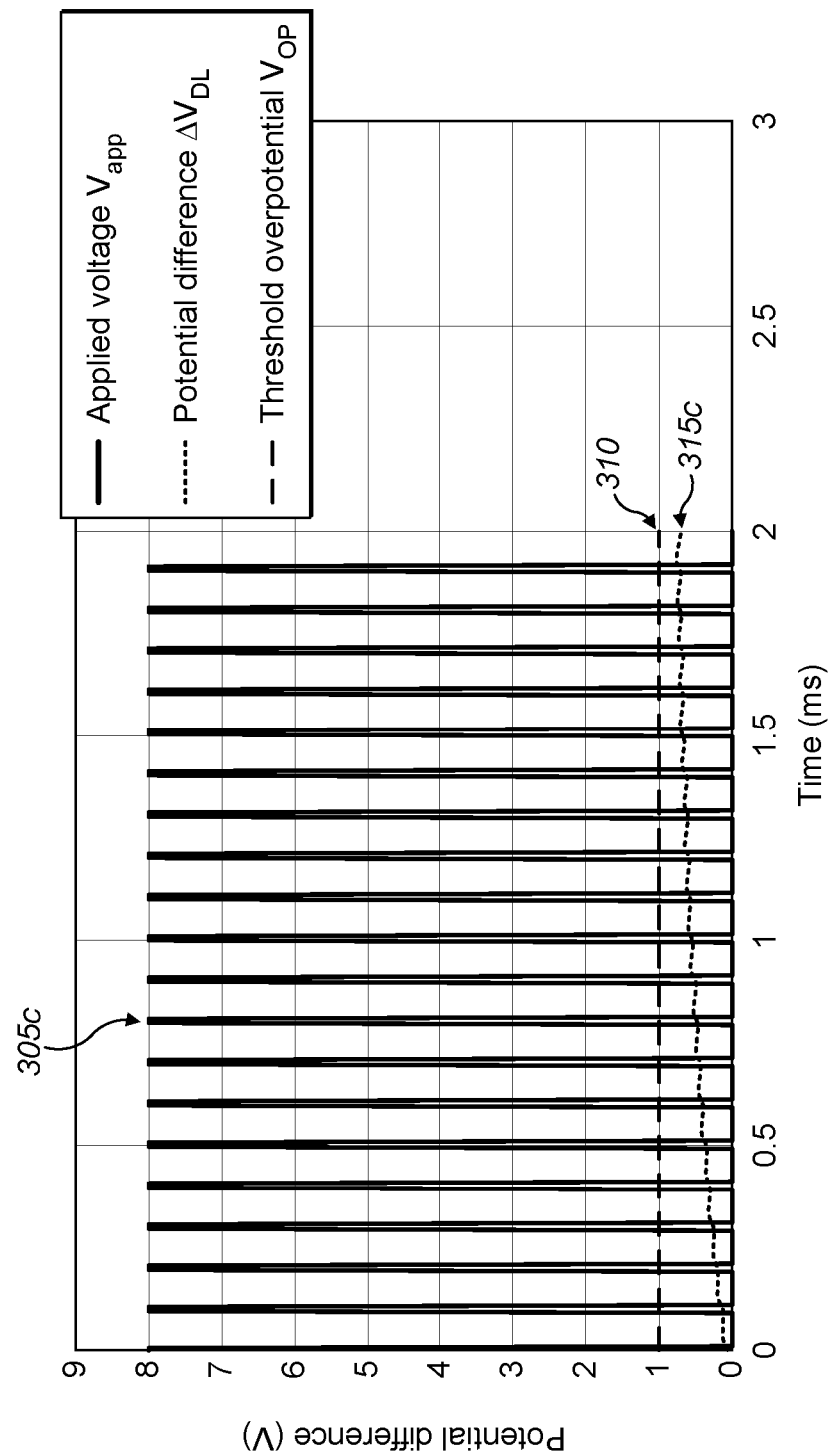
Figure 3D:
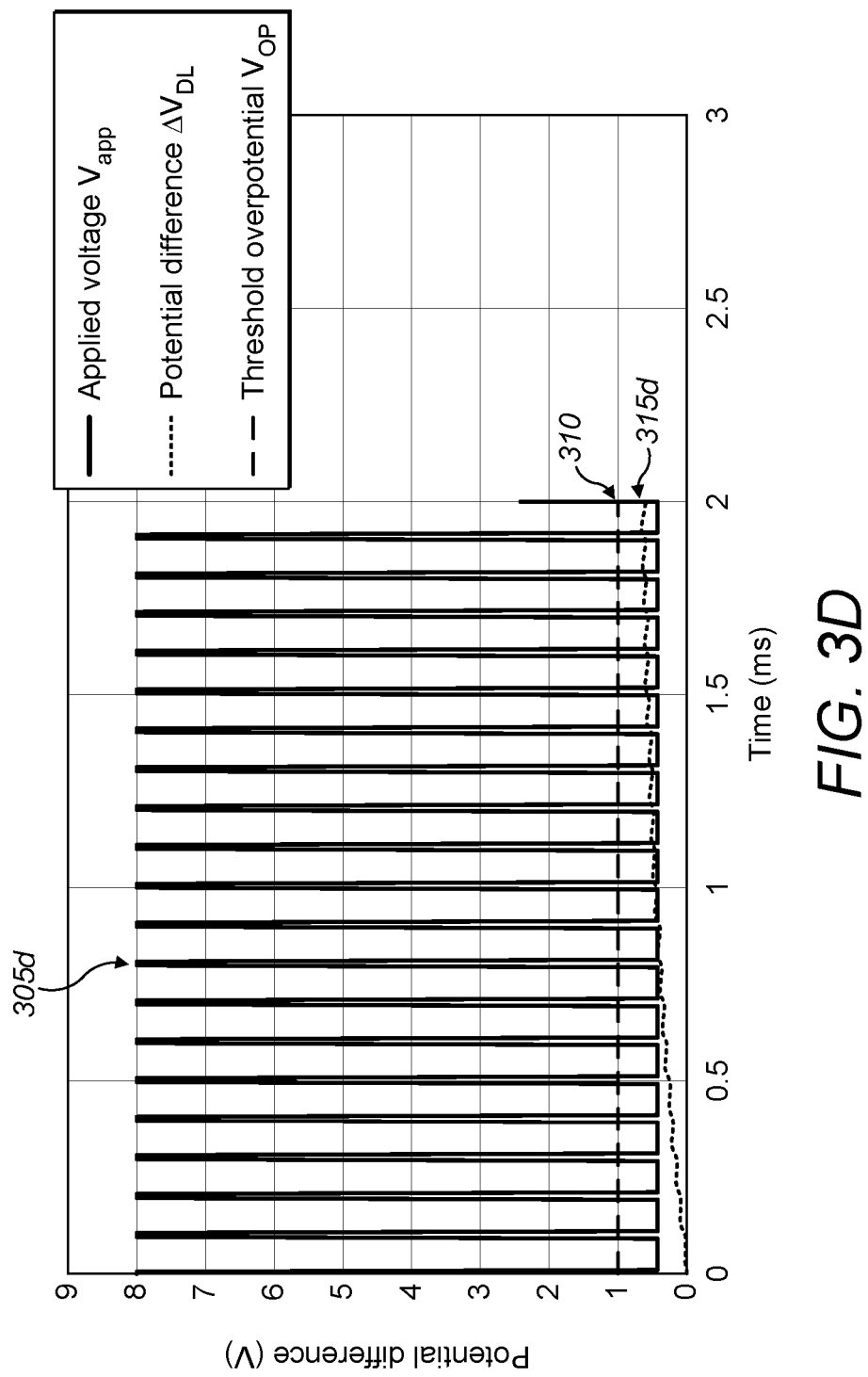
Figure 3E:
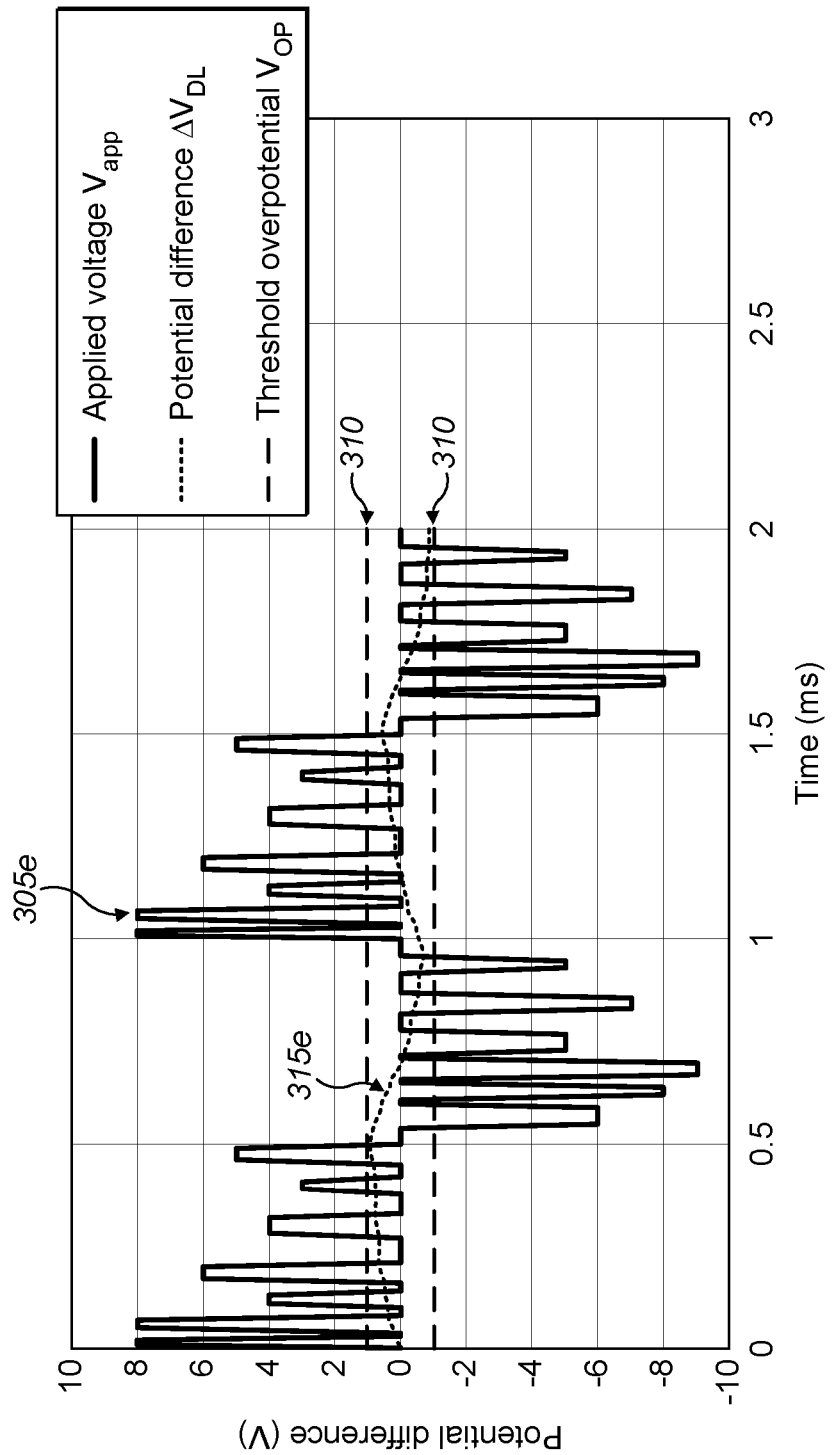

FIG. 3C depicts $V_{app}(t)$ as a series of 10 µs voltage pulses 305c having pulse height of 8V and a 90 µs time period between the pulses. FIG. 3D depicts $V_{app}(t)$ as a series of 5 µs voltage pulses 305d with a pulse height of 8V, in which a potential difference of 0.4V is applied between the pulses. FIG. 3E depicts $V_{app}(t)$ as a pattern of alternating voltage pulses 305e having a pulse height with maximum magnitude greater than $V_{op}$. The pulses are however chosen such that $\Delta V_{DL}(t)$ is always lesser than $V_{op}$.

The inventors have conducted a number of experiments to apply and confirm the validity of the above-discussed principles and techniques. To conduct these experiments, a number of assemblies, each comprising two electrodes and an electrolyte solution, were made. In particular, first, vapour phase evaporation was used to deposit, onto a glass slide, electrodes of nickel-chromium alloy, with an area of 25 mm by 10 mm and thickness 0.1 µm. Then, the electroded regions of the glass slide were immersed into water (the electrolyte solution). The pH of the water was 7.4 whilst the metal ion content was 99 mg/liter and the electrical conductivity was 500 µS/cm. The threshold overpotential for water of this pH was 0.84V and the double-layer charging time was in the region of 10 ms. The electrodes were connected to a power supply that was capable of providing alternating potentials exceeding the threshold overpotential of the assembly and providing alternating periods significantly shorter than the double-layer charging time.

Figure 4:
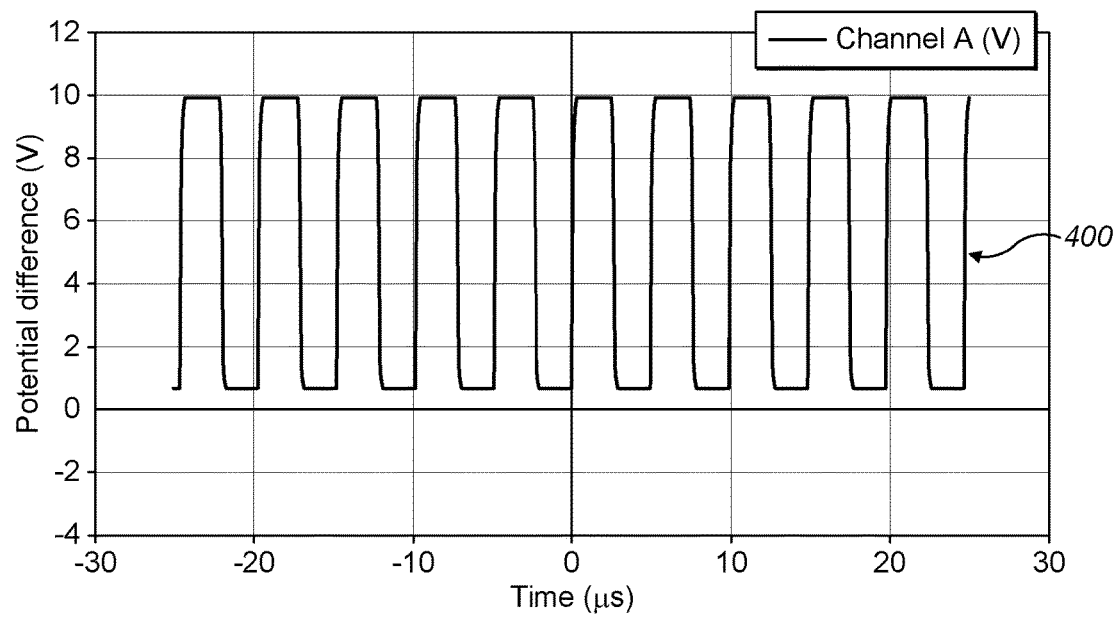
FIG. 4 depicts a waveform of potential difference applied between electrodes immersed in an electrolyte solution in accordance with one experiment.

In the first experiment, a potential difference having the waveform 400, shown in FIG. 4, was applied between the immersed electrodes. The applied potential difference had a frequency of 200 kHz, reaching a maximum of 10V and a minimum of 0.75V. The average applied potential difference was 5.4V. In this experiment, both the periodic maximum potential difference (10V) and the average potential difference (5.4V), measured over a time period greater than the double layer charging time, exceeded the threshold overpotential of 0.84V.

The inventors observed during this experiment that once the potential difference of a waveform 400 shown in FIG. 4 was applied, irreversible processes occurred at the electrodes immersed in the water. In particular, at the anode, metal atoms of the electrode were oxidised to form metal ions and those metal ions left the anode and were solvated by the electrolyte solution. Specifically, for the metals used, the following chemical reactions occurred:

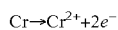

At the cathode, protons present in the water were reduced, and hydrogen gas was produced:

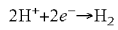

The rate of the reactions was such that gas bubbles started generating at the cathode in less than five seconds of the application of the potential difference waveform 400, whilst damage to the electrode at the anode was seen within 10 seconds of the application of the waveform 400. After 100 seconds, the anode electrode was completely removed.

In the second experiment, an assembly closely similar to the assembly used in the first experiment was used. However, a different potential difference was applied between the electrodes. In particular, an alternating potential difference having a waveform 500, shown in FIG. 5, was applied between the immersed electrodes. It had a frequency of 200 kHz, reaching a maximum of 2.5V and a minimum of −2.5V. To ensure that there was no net DC potential difference, a transformer was used between the power supply and electrodes to provide the potential difference waveform 500. In this experiment, whilst the magnitude of both the maximum and minimum potential differences exceeded the threshold overpotential, the average potential difference, measured over a time greater than the double layer charging time, was close to zero, and therefore smaller than the threshold overpotential of 0.84V. The inventors observed during this experiment that although the potential difference was applied for a total duration of 300 seconds, there were no visible signs of either gas generation or any degradation of either metal electrode.

Figure 6:
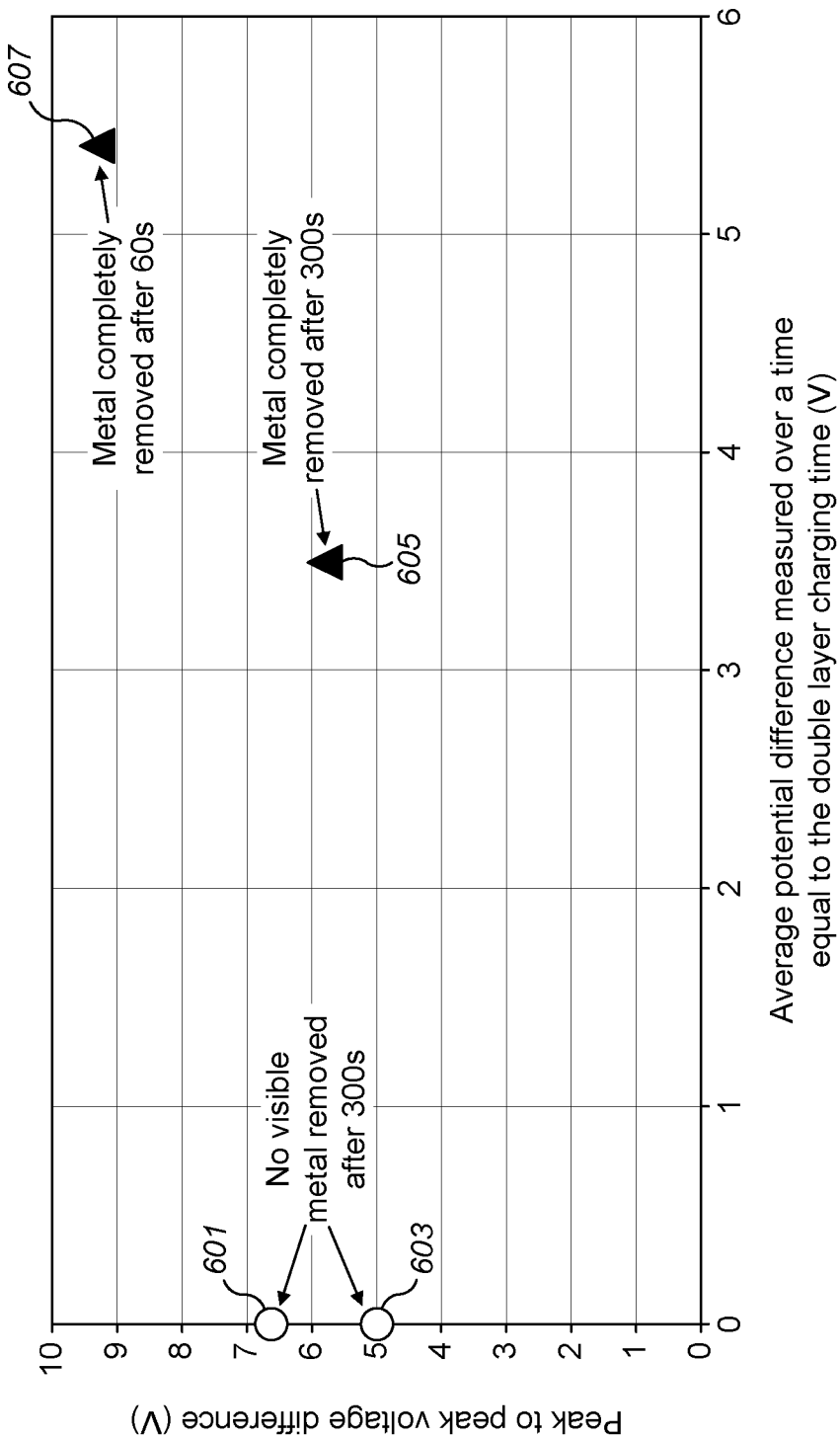
FIG. 6 is a graph showing the results of an experiment repeated for different waveforms with different average values of potential difference.

As shown in FIG. 6, this experiment was repeated using closely similar assemblies for waveforms with different maximum magnitudes and average values of potential difference. In the experiments identified as 605 and 607, the average potential difference, measured over a time greater than the double layer charging time, exceeded the threshold overpotential. Observable electrode degradation began within a few seconds of the application of the potential difference between the electrodes. However, in the experiments identified as 601 and 603 the average potential difference, measured over a time greater than the double layer charging time, was substantially zero. In contrast to the experiments 605 and 607, in the experiments 601 and 603, no visible loss of the electrode material and no gas generation or degradation of the electrodes were observed for the duration of each experiment, which was 300 s.

Figure 5:
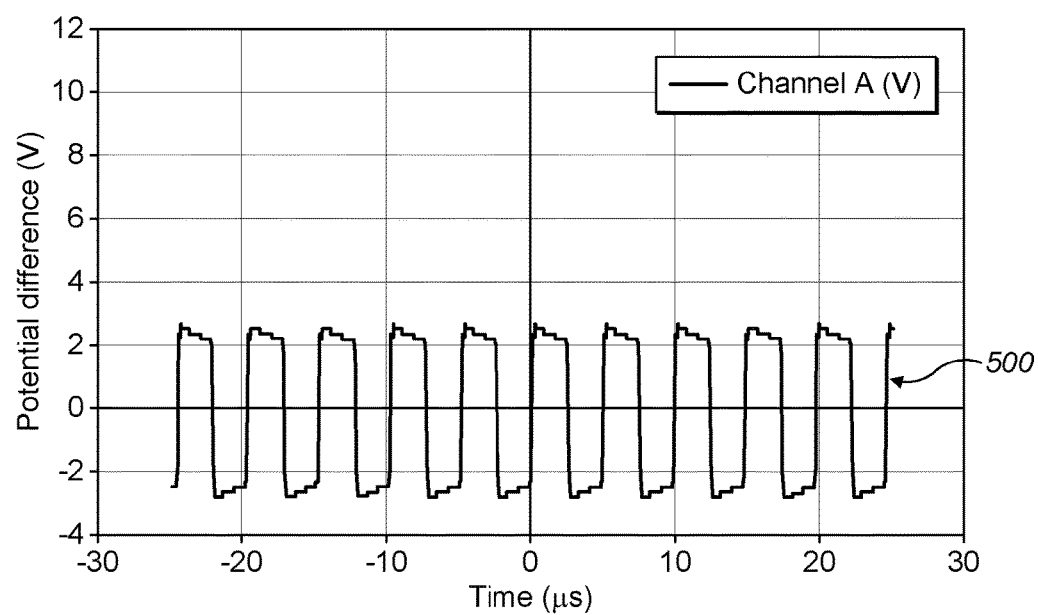
FIG. 5 depicts a waveform of potential difference applied between electrodes immersed in an electrolyte solution in accordance with another experiment.

In the experiments described with reference to FIGS. 4, 5, and 6, a resistive load in the form of a resistor of resistance 1 kΩ was connected in parallel with the pair of water-immersed electrodes. A potential difference was applied across the immersed electrodes with frequency of 200 kHz, maximum voltage of +5V, minimum voltage of −5V such that the average potential difference, measured over a time greater than the double layer charging time, was close to zero. The measured potential difference across the 1 kΩ resistor was up to 10V. The non-zero voltage confirms that electrical energy has been supplied to the resistive load by that waveform.

Referring now to a practical scenario of a shared-wall piezoelectric ink-jet printheads, as discussed above, in accordance with a conventional approach to ejection of a droplet of ink from such printheads, the average potential of the actuator electrodes used to eject droplets may differ from ground potential. If in use, the potential difference between the average positive (or negative) potential of the actuator electrodes and the potential of other conducting components that are in electrical contact with the ink (said average being formed over a time period equal to or greater than the shortest double layer charging time of any pair of conductors formed of an actuator electrode and such another conducting component) exceeds the smallest threshold overpotential $V_{op}$ of any pair of conductors formed of an actuator electrode and such another conducting component, corrosive electrochemical effects will still occur. Such other components may include actuator electrodes on the walls of the shared-wall printheads that are not being used to eject droplets and other non-electrode metal components.

Figure 7:
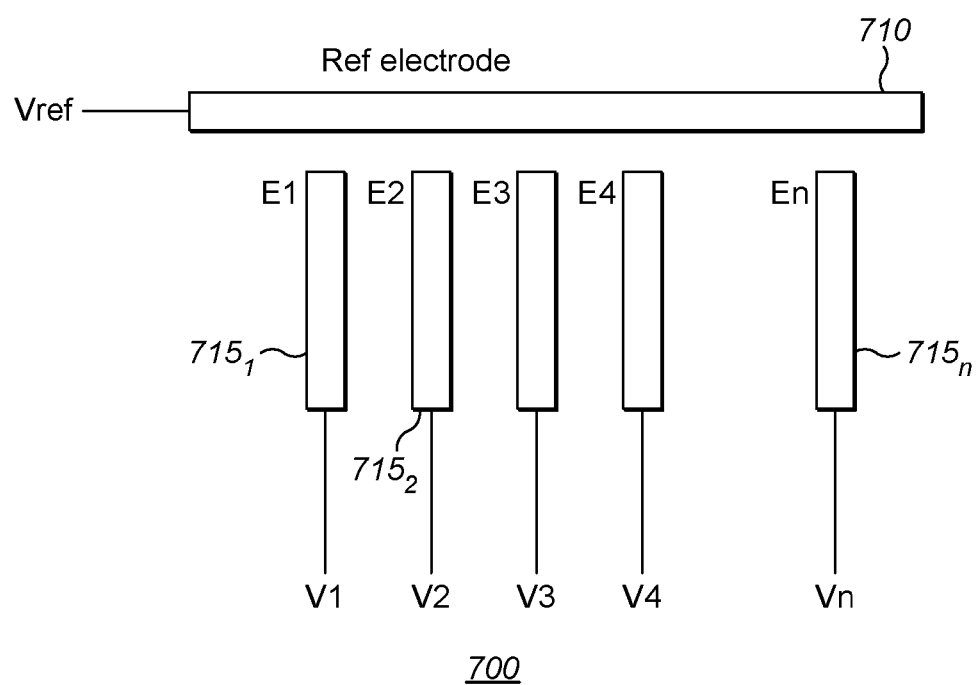
FIG. 7 is a schematic showing how a reference electrode is incorporated into a shared-wall piezoelectric ink-jet printhead assembly according to some embodiments of the present invention.

Electrochemical corrosion occurring between such components and the actuator electrodes may however be avoided by connecting such other components to voltage reference $V_{ref}$ and then controlling $V_{ref}$ such as to maintain such average potential differences below the threshold overpotential $V_{op}$ referred above. One way to achieve this, for example, is to incorporate a reference electrode 710 into a shared-wall piezoelectric ink-jet printhead assembly 700, as shown schematically in FIG. 7, and to use the reference electrode to control the potential of the metallic support components. The reference electrode 710 is electrically shielded from the electrolyte solution, so as not to cause a current to flow in the electrolyte solution under the normal operation of the ink-jet printhead assembly 700. For example, the reference electrode 710 is positioned within the ink-jet printhead assembly 700 so as to not be in fluidic or near-fluidic contact with the electrolyte solution.

In many applications, the waveform timing and potentials are known in advance of their application to the actuator electrodes, and thus the time-average potential applied to each actuator electrode (the average being formed over any time period that one desires) may be calculated. For example, if the potential applied to an actuator electrode V1, shown in FIG. 7 and referenced as $715_1$, takes the form of periodic voltage pulses with respect to ground, each having potential 20V and duration 5 μs, between which the potential is 0V, and which pulses repeat with a period of 500 μs, then the time-average potential of that actuator electrode is $V1_{average}=20. (5/500)=0.2V$. In this manner, the time-average potentials $V1_{average}$, $V2_{average}$, $V3_{average}$, ... $Vn_{average}$ may be determined for the actuator electrodes, such as electrodes $715_1, 715_2, \ldots 715_n$. Further, the overall average of these multiple actuator electrode time-averages, denoted as $Voverall_{average}$, can be calculated as well.

For example, if there are only four such actuator electrodes, respectively having time-average potentials $V1_{average}$, $V2_{average}$, $V3_{average}$, and $V4_{average}$ (each calculated in a manner similar to that described above for $V1_{average}$ in the case that the voltage pulses are of a similar form to that described for $V1_{average}$) then the overall average of all four actuator electrodes is given by:

$$Voverall_{average}=(V1_{average}+V2_{average}+V3_{average}+V4_{average})/4.$$

This $Voverall_{average}$ is then applied to the reference electrode 710. Therefore, if the potentials of the actuator electrodes are being controlled such that the sum of the absolute values of the potential differences between the electrical double layers between any pair of actuator electrodes is kept below $V_{op}$ and if the physical gap between the metallic support components and the actuator electrodes is larger than a gap between neighbouring actuator electrodes, then the sum of the absolute values of the potential differences between the electrical double layers between any actuator electrode and any metallic support component will remain below $V_{op}$.

Figure 8:
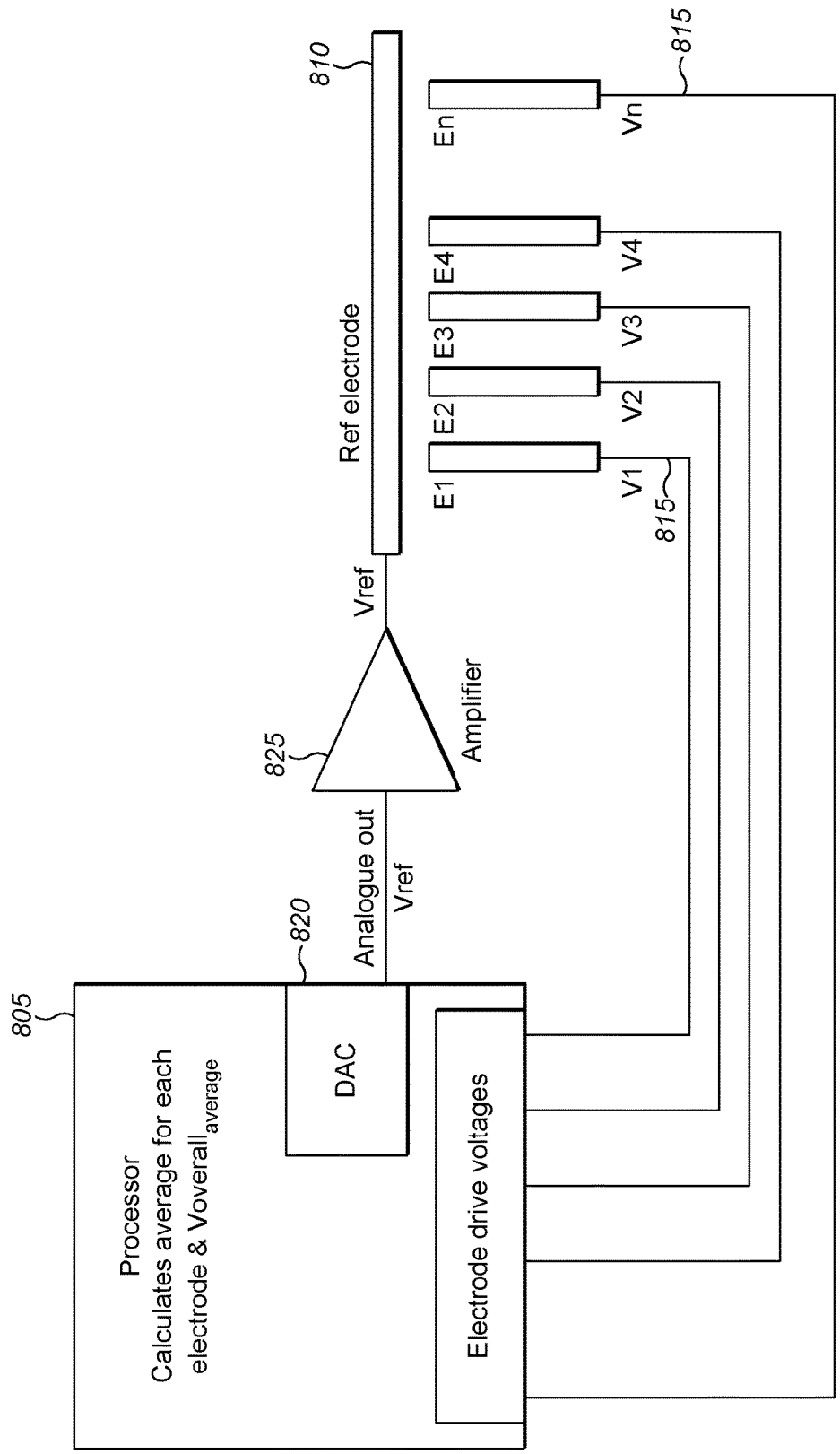
FIG. 8 is a schematic of an electronic circuit with a reference electrode suitable for executing methods described herein, in accordance with some embodiments of the present invention.

FIG. 8 depicts a schematic of a circuit 800 suitable for implementation of the approach described above with reference to FIG. 7. Based on the known drive waveforms for all drive waveforms applied to drive electrodes 815, a processor 805 calculates average values $V_{average}$ for each actuator electrode 815 and their overall average $Voverall_{average}$. The calculated overall average is then converted to an analogue value, using a digital to analogue converter (shown as 'DAC') 820, buffered through an amplifier 825, and applied to a reference electrode 810.

In some applications and some scenarios, the overall average varies with time, such as when an image is being printed by an ink jet printer. Accordingly, real time calculations may be more appropriate and effective. Therefore, instead of using the known drive waveforms and their averages, the processor 805 can calculate a running average of all the actuator electrode drive potentials on the fly (real-time). In this manner, the reference electrode 810 will be provided with a real-time time-varying potential. Furthermore, the time constant of the output can be adjusted to control the speed with which the reference electrode potential changes.

In practice, in some embodiments, the metallic support components are connected to the reference electrode 810. Alternatively, the metallic support components are set to ground potential and the drive voltage pulses to the actuator electrodes 815 are referenced to a potential such that $Voverall_{average}$ is equal to zero.

Alternatively or additionally, the potential of actuator electrodes can be so adjusted using the following approaches, individually or in combination. The potential may be adjusted by applying voltage pulses to individual electrodes of sufficiently-short duration that the piezoelectric actuators to which those actuator electrodes are attached are not displaced sufficiently to cause droplet ejection, whilst the average potential of the actuator electrodes is nonetheless adjusted. For example, the movement response time of actuators used in shared-wall piezoelectric ink jet print heads may be in the region of 1-10 μs and the potentials used to induce droplet ejection using voltage pulses of such durations may typically be in the region of 10V-50V. For such actuators, voltage pulses, having potential conventionally used for droplet ejection (i.e., 10-50V in this example), but of a shorter than the conventionally used duration, e.g., of 200 ns or less, are generally sufficiently short that, although a brief pressure transient is induced within the ink adjacent to the actuator, very little actuator displacement occurs and consequently there is no droplet ejection.

The potential of the actuator electrodes can also be adjusted by applying simultaneously (within the response time of the piezoelectric actuators) substantially the same potential to two nearest-neighbour electrodes. In this manner, there is little or no potential difference across the intervening shared wall actuator, and consequently little displacement of the actuator or pressure transient in the ink is stimulated and consequently, no droplet ejection occurs. Thus, the average potential on each actuator electrode (relative to ground) of the actuator is adjusted without jetting the ink.

Furthermore, the potential of the actuator electrodes can be adjusted by applying voltage waveforms to individual actuator electrodes on the shared-wall piezoelectric actuators having rise times and/or fall times, both as known in the art, that are sufficiently long, for example 50 ms, compared to the timescales characteristic of ink flows in channels adjacent to the actuators that the pressure rise induced by the actuators in the ink as a consequence of those voltage waveforms to the actuators is insufficient to cause ejection of ink as droplets, but nonetheless influences the average potential of that actuator electrode.

Therefore, in accordance with the described methodology, potential difference waveforms whose magnitude is larger than the threshold overpotential can be applied between pairs of electrical conductors adjacent to a common electrolyte solution whilst suppressing or eliminating electrochemical corrosion of those conductors. Further, the described methodology allows the supply of electrical energy, power, and signals to components, devices, systems, and assemblies whose operation requires transmission of electrical energy, power, or signals through electrical conductors that are adjacent to an electrolyte solution environment.

In accordance with the described methodology, a potential difference waveforms that is applied between those conductors is selected and controlled such that the average potential difference of that waveform, calculated over a time interval equal to or greater than the shortest double layer charging time associated with those conductors, is smaller than the threshold overpotential of those conductors in the electrolyte solution. This is in contrast to potential difference waveforms with average potential difference being larger than the threshold overpotential of those conductors that cause electrical current to flow between the conductors through the electrolyte solution, thereby causing electrochemical corrosion of the conductors.

In some embodiments, a power supply system includes additional electrical components to provide an overall electrical source system that allows potential difference waveforms of the power source(s) to be selected such that average potential difference, calculated over a time interval equal to or greater than the shortest double layer charging time associated with the conductors, is larger than the threshold overpotential of the conductors in the electrolyte solution whilst still suppressing electrochemical corrosion of those electrodes. The power source (or supply) system comprises at least (i) an electrical power source that provides a potential difference waveform of magnitude exceeding the threshold overpotential between those conductors, and (ii) series capacitive coupling between those electrical power source(s) and each of those conductors. Such a power source system can be used to supply electrical energy to electrical conductors in a first pair of electrical conductors selected from a plurality of electrical conductors, and thereby to supply electrical energy to an electrical load connected to those conductors.

More generally, such a power system can used to supply electrical energy to electrical conductors to any two or more electrical conductors adjacent to the electrolyte solution. One capacitor may be placed in series with one of the electrical conductors and the power source system. In this way it is possible to transmit the edges of potential difference waveforms between the capacitively coupled conductor and other electrical conductors whilst filtering out low frequency components of those waveforms. Alternatively, two capacitors may be placed such that each one of the electrical capacitors is in series with each of two electrical conductors and that power source system. In this way it is possible to isolate electrically the potential difference waveform applied between those two conductors from the potentials of other conductors whilst still transmitting the edges of potential difference waveforms between the two capacitively coupled electrical conductors. Further still, a series capacitor may be placed between that power source system and each of those conductors.

As discussed further in greater detail, if the electrical load presented by the conductors to the electrical power source system is primarily capacitive in nature, additional electrical resistance is preferably provided between the junction made by each series capacitor with the conductor adjacent to the electrolyte solution to which that capacitor is connected and a common conductor which may be connected to a control potential $V_{control}$.

The capacitance of that capacitive coupling is denoted hereinafter by the symbol $C_s$. Preferably the capacitive coupling is provided by an electrical capacitor and without loss of generality further description will use the term 'capacitor' to refer to such capacitive coupling. The electrical resistance, if used, is denoted hereinafter by the symbol $R_s$. Preferably such resistance is provided by an electrical resistor and without loss of generality further description will use the term 'resistor' to refer to such electrical resistance.

Further description of further features of the invention is provided with reference to capacitive electrical loads, each having capacitance $C_p$, presented by pairs of conductors to the power source system. Loads of this general nature can arise, for example, in the case of the conductors taking the form of electrodes deposited upon the piezoelectric actuators of a 'shared-wall' piezoelectric ink jet printhead. The person skilled in the art will be able to extend the principles disclosed hereinafter to other types of electrical load.

Figure 9:
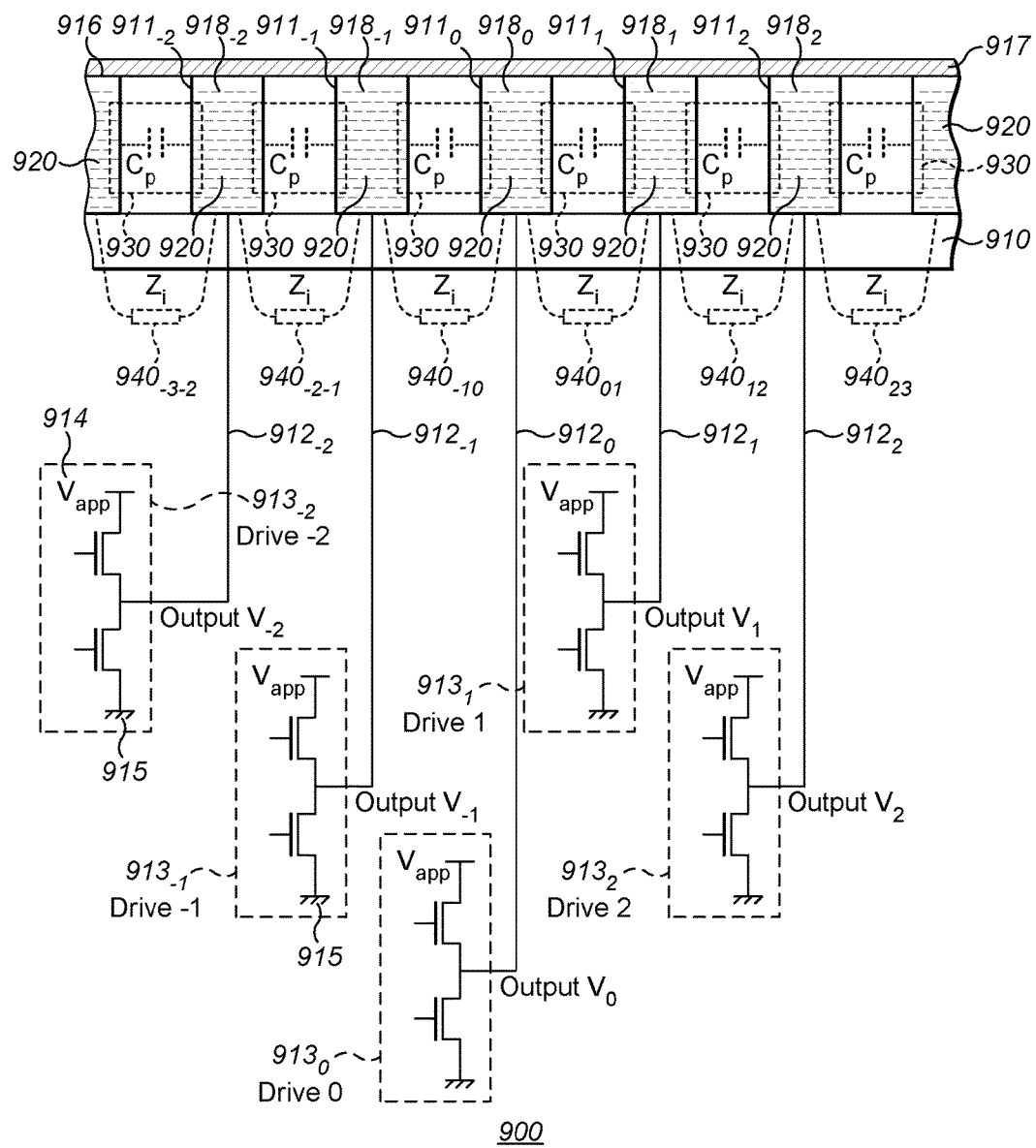
FIG. 9 is a partial schematic cross-sectional view of an example shared-wall piezoelectric printhead, associated impedances and output stage of associated drive electronics.

FIG. 9 shows, in partial schematic cross-section, an example shared-wall printhead 900 of type similar to those described more fully in U.S. Pat. Nos. 6,106,092A, 6,193,343B1, and US2009/0073207A1. In brief, conductors in the form of electrodes . . . $911_{-2}$, $911_{-1}$, $911_0$, $911_1$, $911_2$ . . . are deposited onto the walls of grooves having uniform spacing and width cut into a piezoelectric material body 910. The material of the piezoelectric body 910 presents, between each pair of nearest-neighbour electrodes (e.g., between electrodes $911_0$ and $911_1$), an electrical capacitance $C_p$, as shown schematically at each location 930. Each of electrodes . . . $911_{-2}$, $911_{-1}$, $911_0$, $911_1$, $911_2$ . . . is also connected via individual wires . . . $912_{-2}$, $912_{-1}$, $912_0$, $912_1$, $912_2$ . . . to respective power sources, which are in this scenario individual outputs of 'push-pull' field-effect transistor ('FET') output stages . . . $913_{-2}$, $913_{-1}$, $913_0$, $913_1$, $913_2$ . . . connected to electrical power supply (not shown). These outputs thereby provide, to the corresponding electrodes, voltage potentials, respectively . . . $V_{-2}$, $V_{-1}$, $V_0$, $V_1$, $V_2$ . . . . The voltage potentials . . . $V_{-2}$, $V_{-1}$, $V_0$, $V_1$, $V_2$ . . . are individually time-wise switchable by an electronic control system (not shown) connected to the gates of the FETs between the potential $V_{app}$, shown for example at 914, and electrical ground, shown for example at 915, provided by the electrical power supply. Therefore, two or more individual outputs of 'push-pull' FET output stages . . . $913_{-2}$, $913_{-1}$, $913_0$, $913_1$, $913_2$ . . . together with that electrical power supply comprise one or more electrical power sources forming a power source system that provides potential difference waveform(s) between two or more of the electrical conductors . . . $911_{-2}$, $911_{-1}$, $911_0$, $911_1$, $911_2$ . . . .

A top plate 917 is bonded to the remaining upper surface 916 of the body 910, thereby creating channels . . . $918_{-2}$, $918_{-1}$, $918_0$, $918_1$, $918_2$ . . . In use, the channels . . . $918_{-2}$, $918_{-1}$, $918_0$, $918_1$, $918_2$ . . . are filled with a liquid electrolyte 920, such as an aqueous ink, for ejection from those channels. The electrolyte supply (not shown) to all channels . . . $918_{-2}$, $918_{-1}$, $918_0$, $918_1$, $918_2$ . . . is common, most typically from a manifold at one or both ends of the channels ... $918_{-2}, 918_{-1}, 918_0, 918_1, 918_2$ ... (the sectional view of FIG. 9 does not show the ends of channels).

According to at least some methods of the printhead operation, to eject droplets from a given channel (e.g., channel $918_0$), the FET output stages are switched so that at least one voltage pulse of potential $V_{app}$ is applied to the electrode corresponding to that channel (e.g., electrode $911_0$) whilst its nearest-neighbour electrodes (e.g., electrodes $911_{-1}$ and $911_1$) are held at ground potential, thereby creating one or more pulses of potential difference $V_{app}$ (e.g. in this case $V_0=V_{app}$, $V_{-1}=0$, $V_1=0$ so that $(V_0-V_{-1})=(V_0-V_1)=V_{app}$) between the nearest-neighbour electrodes.

There are many such drive schemes, the details of which are discussed in, for example US2009/0073207A1 and U.S. Pat. No. 6,193,343B1. However, the main characteristics of these drive schemes are:

(i) producing potential differences (such as $V_0-V_{-1}$) between pairs of electrodes of magnitudes $V_{app}$ whose average, taken over a time period equal to or greater than a double-layer charging time, $\tau_{DL}$, can exceed the threshold overpotential $V_{op}$; and (ii) operating with unipolar potentials such that the time average potential difference, taken over a time period equal to or greater than a double-layer charging time $\tau_{DL}$, between an assembly of such electrodes in a printhead and another electrical conductor also in contact with the electrolyte fluid exceeds the threshold overpotential $V_{op}$.

These characteristics can cause electrochemical corrosion, which the methods and techniques described in this disclosure aim to suppress or eliminate.

The inventors have realised that, because the electrolyte supply to all channels ... $918_{-2}, 918_{-1}, 918_0, 918_1, 918_2$ ... is common, the electrolyte 920 presents an electrical impedance between each pair of the nearest-neighbour electrodes ... $911_{-2}, 911_{-1}, 911_0, 911_1, 911_2$ .... Each such impedance may be represented as $Z_i$ and is shown schematically in FIG. 9 at locations ... $940_{-3-2}, 940_{-2-1}, 940_{-10}, 940_{01}, 940_{12}, 940_{23}$ .... As can be seen in FIG. 9, each impedance $Z_i$ appears electrically in parallel with each corresponding capacitance $C_p$ as shown schematically at each location 930.

The electrolyte 920 also presents an electrical impedance between non-nearest-neighbour electrodes. However, in the described geometry of FIG. 9 such non-nearest-neighbour impedances have lesser influence upon the operation of the printhead than the impedances $Z_i$ between nearest-neighbour electrodes.

As described with reference to FIG. 2, the application of a potential difference waveform between pairs of nearest-neighbour electrodes, for example, taken from the electrodes ... $911_{-2}, 911_{-1}, 911_0, 911_1, 911_2$ ..., causes ionic flow in the electrolyte, such as the electrolyte solution 920 and the formation of double layers DL1 and DL2 of electrical charge adjacent to those electrodes. In the understanding of the inventors, in the geometry shown in FIG. 9 there will, in general, be two spatially separate double layers formed adjacent to each electrode. One double layer of a given electrode will be formed principally adjacent to the left-hand half of that electrode according to the potential difference between that electrode and the nearest-neighbour electrode to its left. A second double layer of that given electrode will be formed principally adjacent to the right-hand half of that electrode according to the potential difference between that electrode and the nearest-neighbour electrode to its right.

Accordingly, for such geometries the conventions used throughout this disclosure are that (i) the double layers adjacent to any driven electrode are labelled DL1 and those adjacent to any non-driven electrode are labelled DL2, (ii) the double layers formed between electrode $911_m$ and $911_n$ are labelled $DL1_{mn}$ for the driven electrodes and $DL2_{mn}$ for non-driven electrodes. For example, if output $V_0$ of drive 0 at $913_0$ is non-zero and all other drive outputs ... $V_{-2}, V_{-1}, V_1, V_2$ ... at ... $913_{-2}, 913_{-1}, 913_1, 913_2$ ... are zero, then double layer $DL1_{0-1}$ represents the double layer adjacent the left-hand half of electrode $911_0$, whose double layer forms part of the electrolyte impedance between the electrodes $911_0$ and $911_{-1}$. Similarly, double layer $DL1_{01}$ represents the double layer adjacent the right-hand half of the electrode $911_0$ whose double layer forms part of the electrolyte impedance between the electrodes $911_0$ and $911_1$. Also similarly, double layer $DL2_{-10}$ is the double layer formed in the right-hand half of the electrode $911_{-1}$ and $DL2_{10}$ is the double layer formed in the left-hand half of the electrode $911_1$.

Figure 10B:
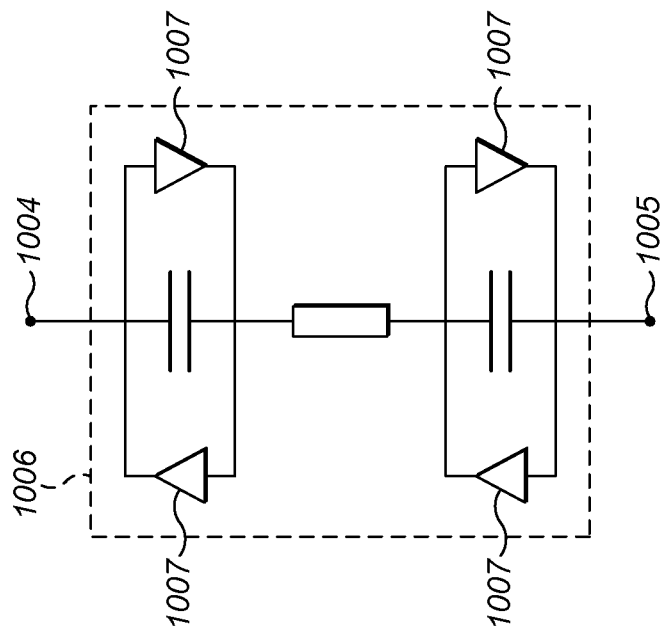
FIG. 10B is a representation of the electrical impedance of the electrolyte between electrodes within a piezoelectric printhead when a potential difference applied between the electrodes is larger than the threshold overpotential.
Figure 10A:
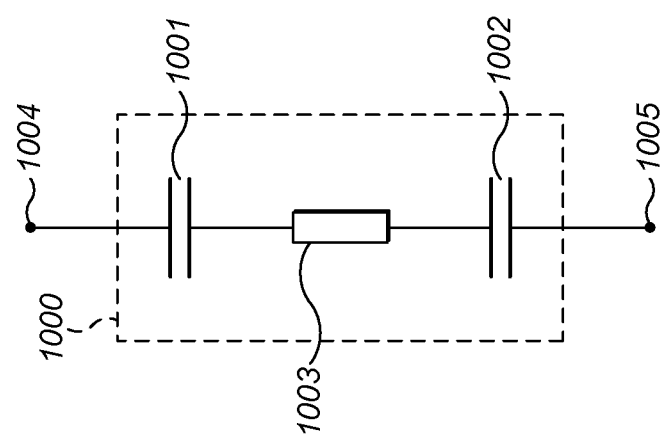
FIG. 10A is a representation of the electrical impedance of the electrolyte between electrodes within a piezoelectric printhead when a potential difference applied between the electrodes is smaller than the threshold overpotential.

FIG. 10A shows at 1000 the electrical representation of the impedance $Z_i$ between terminals 1004 and 1005, in the case that potential differences applied between these terminals are lesser than the threshold overpotential $V_{op}$. Terminals 1004 and 1005 are to be understood to be electrically in contact with a pair of the nearest-neighbour electrodes such as, for example, the electrodes $911_0$ and $911_1$ respectively. Since the potential differences applied between those terminals are lesser than the threshold overpotential $V_{op}$, there is no current flow across $DL1_{01}$ and $DL2_{10}$. The capacitance $C_{DL1}$ of a double layer $DL1_{01}$ is shown at 1001 and the capacitance $C_{DL2}$ of a double layer $DL2_{10}$ is shown at 1002. The electrical resistance $R_{ionic}$ presented by ionic conduction between those double layers is shown as a resistor 1003. Typical values in a piezoelectric printhead used with an aqueous electrolyte are $C_{DL1}$~5 nF, $C_{DL2}$~5 nF, $C_p$~400 pF and $R_{ionic}$~100 kΩ. Typically, therefore, $C_p \ll C_{DL1}, C_{DL2}$.

FIG. 10B shows at 1006 the electrical representation of impedance $Z_i$ in the case that a potential difference that is applied between terminals 1004 and 1005 is larger than the threshold overpotential $V_{op}$. Similarly to the discussion of FIG. 10A, the terminals 1004 and 1005 are to be understood to be electrically in contact with a pair of nearest-neighbour electrodes such as, for example, the electrodes $911_0$ and $911_1$. In the scenario of FIG. 10B, current can flow across $DL1_{01}$ and $DL2_{10}$, in a direction according to the polarity of the electrical potential difference applied between the terminals 1004 and 1005. This can be represented electrically by the addition of electrical diodes 1007 electrically in parallel across each double layer. In this and other Figures depicting electrical circuits and accompanying this disclosure, lines drawn to connect electrical components typically represent electrical wires or conductors.

Figure 11:
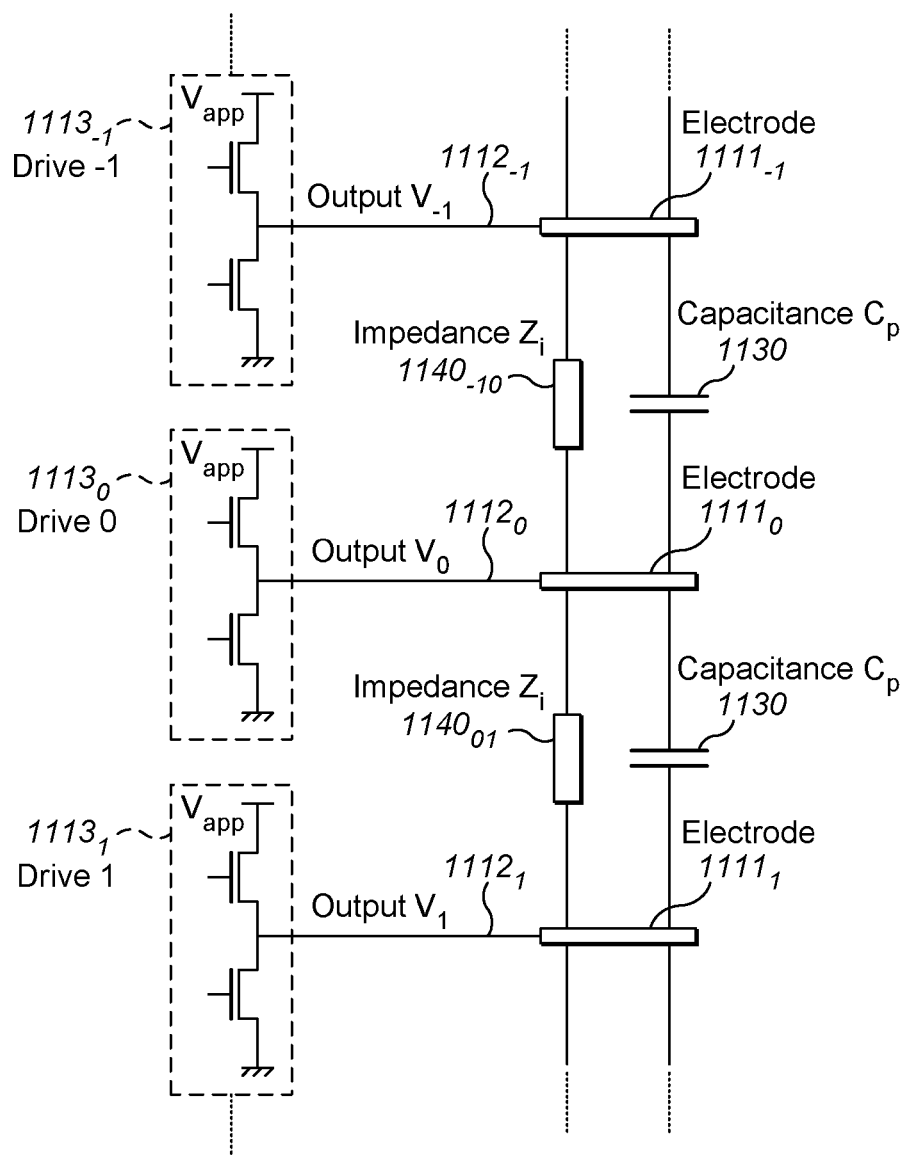
FIG. 11 shows an electrical circuit for use by a shared-wall piezoelectric printhead to eject droplets of electrolyte.

The overall electrical circuit that can be used by the printhead 900 of FIG. 9 to eject droplets of the electrolyte is shown in FIG. 11. The impedance $Z_i$ at $1140_{01}$ comprises $DL1_{01}$, $R_{ionic}$, and $DL2_{10}$. Other impedances are similarly represented. In operation, to eject droplets from the channel $918_0$ of the printhead 900, the FET output stages within the drives $1113_0$, $1113_{-1}$, and $1113_1$ are switched so that the 'Drive 0' FET output stage $1113_0$ provides at least one voltage pulse of potential $V_{app}$ to the electrode $1111_0$ (corresponding to the electrolyte-filled channel $918_0$) whilst the 'Drive −1' and 'Drive 1' FET output stages $1113_{-1}$ and $1113_1$ hold the nearest-neighbour electrodes $1111_{-1}$ and $1111_1$ at ground potential. This creates one or more pulses of potential difference $(V_0-V_{-1})=(V_0-V_1)=V_{app}$ between those nearest-neighbour electrodes. In turn, this causes actuation of the piezoelectric material between the electrodes $1111_{-1}$ and $1111_0$ and piezoelectric material between the electrodes $1111_1$ and $1111_0$ to expel liquid electrolyte from the channel $918_0$ of the printhead 900. Expulsion of the electrolyte from other channels is effected in similar fashion as described in more detail, for example, in US2009/0073207A1 and U.S. Pat. No. 6,193,343B1.

Figure 12:
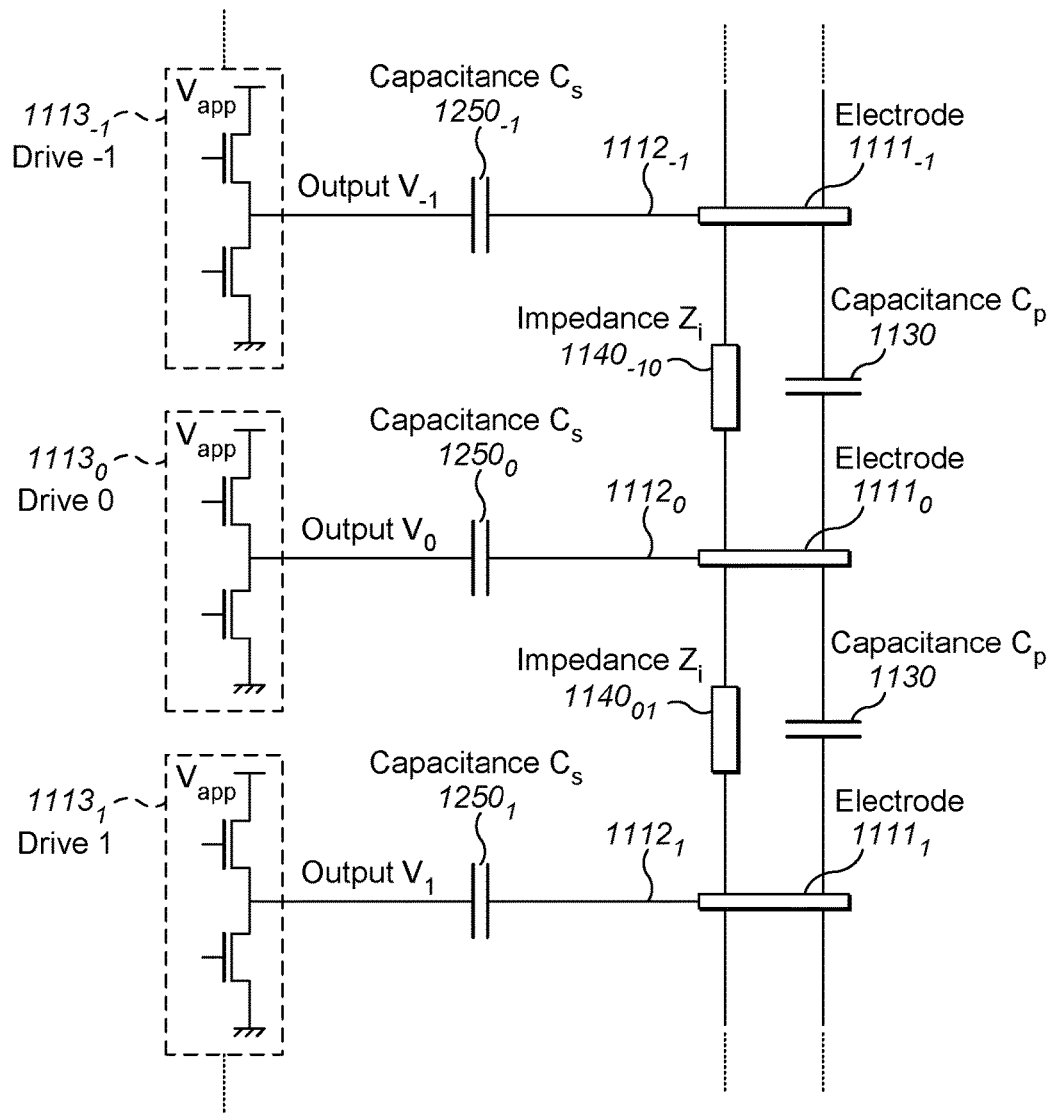
FIG. 12 shows an electrical circuit for use by a shared-wall piezoelectric printhead to eject droplets of electrolyte, in accordance with some embodiments of the invention.

FIG. 12 shows modifications to the circuit of FIG. 11 by adding in-series capacitors $C_s$ in accordance with some embodiments. In particular, the capacitors $C_s$, shown at . . . $1250_{-1}$, $1250_0$, $1250_1$ . . . are introduced between the connecting wires . . . $1112_{-1}$, $1112_0$, $1112_1$ . . . and the FET output stages of corresponding drives . . . $1113_{-1}$, $1113_0$, $1113_1$ . . . . Similar to the circuit of FIG. 11, where no capacitances $C_s$ are provided, in an exemplary operation to eject droplets from the channel $918_0$ of the printhead 900, the FET output stages within the drives $1113_0$, $1113_{-1}$, and $1113_1$ are still switched so that the 'Drive 0' FET output stage $1113_0$ provides at least one voltage pulse of potential $V_{app}$. However, this pulse is now capacitively coupled to the electrode $1111_0$ by the capacitance $1250_0$; whilst the 'Drive −1' and 'Drive 1' FET output stages $1113_{-1}$ and $1113_1$ apply ground potential to one side of the capacitances $1250_{-1}$ and $1250_1$ respectively. There is therefore an electrical path from the 'Drive 0' FET output stage $1113_0$ (providing pulsatile potential $V_{app}$), through the capacitance $C_s$ at $1250_0$ to the electrode $1111_0$, then through the $Z_i$ impedance at $1140_{-10}$ in parallel with $C_p$ to the electrode $1111_{-1}$, then through capacitance $C_s$ at $1250_{-1}$ to the 'Drive −1' FET output stage at $1113_{-1}$ (providing ground potential). There is likewise an electrical path from the 'Drive 0' FET output stage $1113_0$, (providing pulsatile potential $V_{app}$), through capacitance $C_s$ at $1250_0$ to electrode $1111_0$, then through the $Z_i$ impedance at $1140_{01}$ in parallel with $C_p$ to the electrode $1111_1$, then through the capacitance $C_s$ at $1250_1$ to the 'Drive 1' FET output stage at $1113_1$ (also providing ground potential). These are the 'nearest-neighbour' electrical paths for channel $918_0$ (shown in FIG. 9).

For a given $V_{app}$, the insertion of the capacitances $C_s$ reduces the magnitude of the potential difference waveform applied across the load capacitance $C_p$, designated by reference numeral 1130, so that some increase in $V_{app}$ may be needed to achieve the same ejection performance of the printhead as is achieved without the capacitances $C_s$.

An example of how to select the value of the capacitance $C_s$ when supplying energy or power from a power source system to a piezoelectric actuator in an inkjet printhead is described below in context of a shared wall ink-jet printhead. Its piezoelectric actuators present an electrical load that is principally, but not entirely capacitive. The person skilled in the art would be able to extend these principles to other types of electrical load and other applications, without undue experimentation.

In the context of this disclosure, the capacitance of the piezoelectric actuator is represented as $C_p$, $V_{app}$ is defined to be the potential difference waveform provided by a power source system, and the minimum magnitude of the potential difference required by the actuator to perform the ejection task is referred to as $V_{req}$. The value of $V_{req}$ will be influenced by the particular design of the piezoelectric ink-jet printhead, the nature of the liquid that it is ejecting, the size of the droplets to be ejected, and many other factors. Keeping such factors constant, if the power source system is connected directly to the electrode pair, then the condition for ejection of droplets is simply $V_{app} \geq V_{req}$.

If, however, the power source system provides potential difference waveform $V_{app}$ to the primarily-capacitive load $C_p$, presented by the piezoelectric actuator via a single capacitor of the capacitance $C_s$ connected between that power source and one electrode of the pair, the magnitude of the resulting potential difference between the electrodes is $V_{app} \cdot C_s/(C_s+C_p)$, and thus is lesser than $V_{app}$. For satisfactory ejection, the following increase of $V_{app}$ is required: $V_{app} \geq V_{req} \cdot (C_s+C_p)/C_s$.

If the power source system provides a potential difference waveform V(t) to that load via two capacitors, each of the capacitance $C_s$, where one of the capacitors is connected between that power source and the first electrode of the pair and the second capacitor is connected between that power source and the second electrode of the pair, then the magnitude of the resulting potential difference between the electrodes is $V_{app} \cdot (0.5C_s)/(0.5C_s+C_p)$. In this case, for satisfactory ejection, the following increase to $V_{app}$ is required: $V_{app} \geq V_{req} \cdot (0.5C_s+C_p)/(0.5C_s)$. It is generally desirable, therefore, to select $C_s$ such that $C_s \gg C_p$, thereby minimising the increase in potential difference that the power source system needs to supply.

In the case that a capacitor $C_s$ is connected as described above and in addition a coupling resistor $R_s$ is provided either (i) between one electrode of the pair and a control potential or (ii) between one electrode of the pair and a second further resistor $R_s$ connected to a second electrode of the pair, the time constants for $R_sC_p$ and $R_sC_s$ can be large compared to the 'risetime' (as understood in the electronic arts) of the potential difference waveform $V_{app}$. This will not significantly further reduce the potential difference between the electrodes that induces the actuation of the piezoelectric actuator and any consequent desirable increase in $V_{app}$ to maintain droplet ejection is very small.

In general, when using coupling capacitors $C_s$, the design process becomes:

(i) determine $V_{req}$;
(ii) determine, for the particular electrolyte and electrode geometry, the threshold overpotential and double-layer charging times;
(iii) select, if possible, values of the capacitance $C_s$ and the magnitude of $V_{app}$ such that $V_{app} \geq V_{req} \cdot (C_s+C_p)/C_s$ or $V_{app} \geq V_{req} \cdot (0.5C_s+C_p)/(0.5C_s)$ (as appropriate), whilst the sum of the absolute magnitudes of the potential differences across the double layers are kept below the threshold overpotential;
(iv) select $R_s$ such that, with that value of $C_s$, the time constants given by $R_sC_p$ and $R_sC_s$ are large compared to the 'risetime' (as understood in the electronic arts) of the potential difference waveform $V_{app}$ and such that the time constants given by $R_sC_p$ and $R_sC_s$ are small compared to the shortest of the double layer charging times.

If the maximum pulse duration $\delta t$ is selected to be shorter than the time period $\Delta t$ during which $\Delta V_{DL}(t)$ remains smaller than $V_{op}$, then there is no current flow through the double layers $DL1_{01}$ and $DL1_{0-1}$ or the double layers $DL2_{10}$ and $DL2_{-10}$ within the $Z_i$ impedances at $1240_{01}$ and $1240_{-10}$. As noted above in relation to FIG. 2, practical values for $\delta t$ are (i) $\delta t < \tau_{DL}$ for $V_{app} \sim 1.5V_{op}$, (ii) $\delta t < 0.1\tau_{DL}$ for $V_{app} \sim 10V_{op}$, and (iii) $\delta t < 0.02\tau_{DL}$ for $V_{app} \sim 50V_{op}$, There are further capacitively-coupled electrical paths from the 'Drive 0' FET output stage $1113_0$ and the FET output stages of other (non-nearest-neighbour) drives. However, if $C_s$ is selected such that $C_s/2 \gg C_p$ then:

(i) the electrical impedance to voltage pulses presented by $C_p$ is much larger than that presented by $C_s$ and to a very good approximation these further electrical paths may be neglected in comparison to the nearest-neighbour paths;

(ii) the reduction in magnitude of the potential difference waveform applied across the load capacitance $C_p$ noted above is small. In this way, the supply of electrical energy, power and/or signals to the corresponding piezoelectric actuator is only slightly diminished from the case where no capacitors $C_s$ are used.

Figure 13:
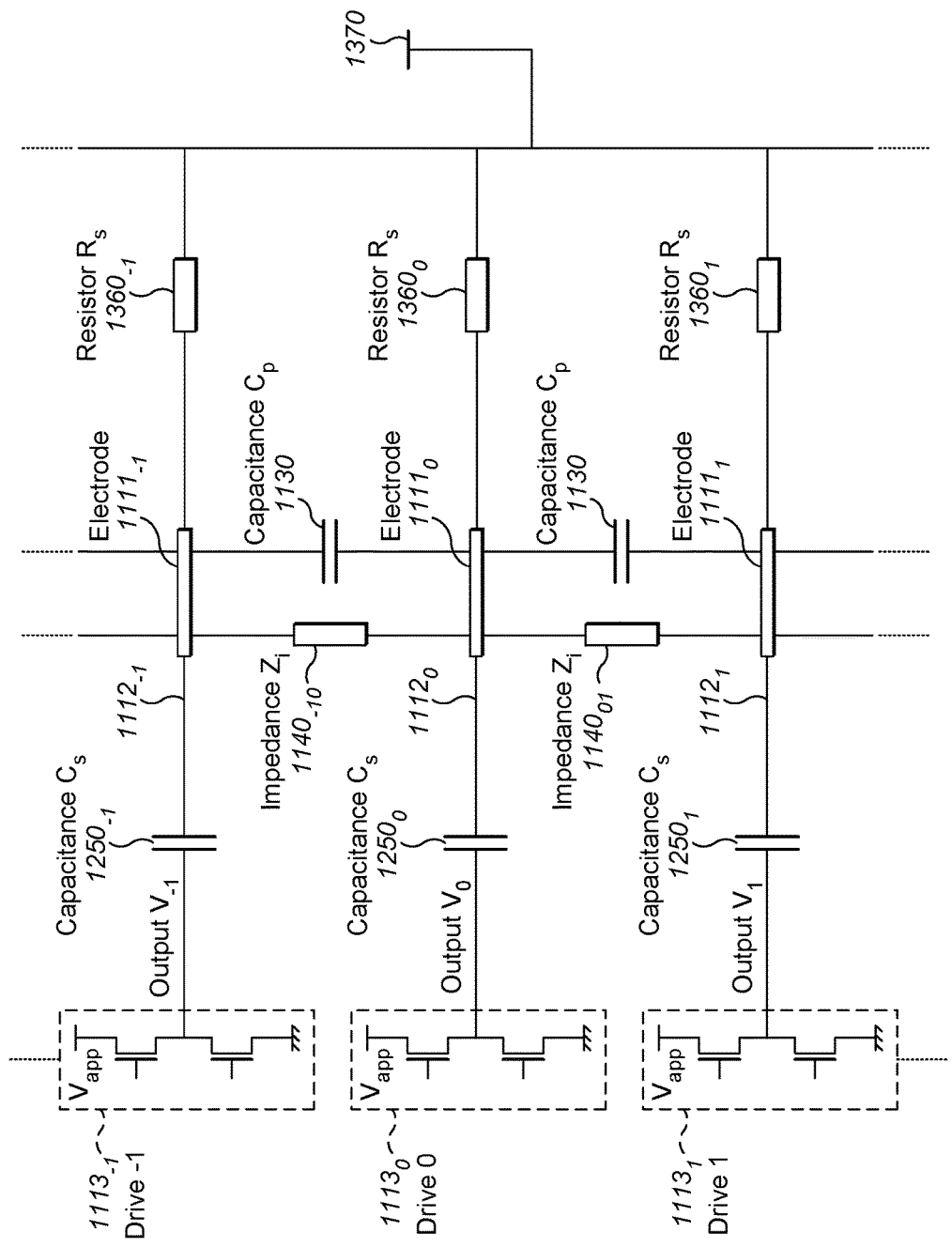
FIG. 13 shows another electrical circuit for use by a shared-wall piezoelectric printhead to eject droplets of electrolyte, in accordance with some embodiments of the invention.

In at least the case where the load is purely capacitive, the capacitive coupling technique described above with reference to FIG. 11 is not always by itself sufficient to prevent the average potential from exceeding the overpotential, and thus a limited level of electro-chemical degradation can result. In such cases, in accordance with some embodiments, resistors $R_s$ are added and connected between the electrodes. FIG. 13 shows further modifications to the circuit of FIG. 11. In particular, the circuit of FIG. 13 is substantially similar to the circuit of FIG. 12, however also provides for resistors $R_s$ connected to a common conductor 1370.

More specifically, FIG. 13 shows added resistors $R_s$ . . . 1360$_{-1}$, 1360$_0$, 1360$_1$ . . . connected together, which can be achieved by connecting them to a common conductor 1370. Considering the same case where, in exemplary operation to eject droplets from channel 918$_0$, the FET output stages within drives 1113$_0$, 1113$_{-1}$, and 1113$_1$ are switched so that the 'Drive 0' FET output stage 1113$_0$ provides a voltage pulse of potential $V_{app}$ that is capacitively coupled to electrode 1111$_0$ by a first capacitance $C_s$ at 1250$_0$; whilst the 'Drive −1' and 'Drive 1' FET output stages 1113$_{-1}$ and 1113$_1$ apply ground potential to one side of second and third capacitances $C_s$ at 1250$_{-1}$ and 1250$_1$ respectively. As a result, the double layers DL1$_{01}$ and DL1$_{0-1}$ and the double layers DL2$_{10}$ and DL2$_{-10}$ within the $Z_i$ impedances at 1140$_{01}$ and 1140$_{-10}$ become charged to some extent, with potential differences across those double layers in each case being respectively $\Delta V_{DL1}$ (by the symmetry of the geometry and potentials applied the same potential differences appear across both DL1$_{01}$ and DL1$_{0-1}$) and $\Delta V_{DL2}$ (by the symmetry of the geometry and potentials the same potential differences appear across both DL2$_{10}$ and DL2$_{-10}$).

By the electrical path through resistors $R_s$ at 1360$_0$ and 1360$_{-1}$, the potential differences $\Delta V_{DL1}$ and $\Delta V_{DL2}$ of impedance $Z_i$ at 1140$_{-10}$ are discharged to 0V with a characteristic time constant $\tau_s$ given by $\tau_s \sim R_s C_s$. Similarly, by the electrical path through resistors $R_s$ at 1360$_0$ and 1360$_1$, the potential differences $\Delta V_{DL1}$ and $\Delta V_{DL2}$ of impedance $Z_i$ at 1140$_{01}$ are discharged to 0V also with a characteristic time constant $T_s$ given by $\tau_s \sim R_s C_s$. $R_s$ can generally be chosen so that $\tau_s < \tau_{DL}$ and preferably $\tau_s \ll \tau_{DL}$ whilst still observing the preferred condition that $C_s/2 \gg C_p$. In this way, provided that the voltage pulses $V_{app}$ also have time duration δt short compared to $\tau_{DL}$ (more specifically, provided that δt<$T_{DL}$ for $V_{app} \sim 1.5 V_{op}$, δt<$0.1\tau_{DL}$ for $V_{app} \sim 10 V_{op}$, δt<$0.02\tau_{DL}$ for $V_{app} \sim 50 V_{op}$) a sum of the absolute magnitudes of the potential differences $\Delta V_{DL1}$ and $\Delta V_{DL2}$ never exceeds $V_{op}$ and so electrochemical corrosion is suppressed or prevented.

For example, with typical values within a piezoelectric printhead C~400 pF, $\tau_{DL}$~1 mS and $C_{DL1}$, $C_{DL2}$~5 nF, one may choose $C_s$~10 nF and $R_s$~10 kΩ so that $\tau_s$~100 μs$\ll\tau_{DL}$. In many such printheads the typical pulse duration is δt~1 μs-20 μs.

Further, if desired, a control potential $V_{control}$ (not shown) may be applied to common conductor 1370. This is helpful in the case where the system also has a further conductor in contact with the electrolyte at a potential $V_{remote}$ different to that at the common conductor 1370 of the resistors. Setting $V_{remote} - V_{op} \le V_{control} \le V_{remote} + V_{op}$ prevents current flows between the electrodes . . . 1111$_{-2}$, 1111$_{-1}$, 1111$_0$, 1111$_1$, 1111$_2$ . . . and the further conductor which, whilst transient, may (depending on the geometry of the system and nature of the electrolyte) otherwise persist for a duration sufficiently long to cause corrosion. In systems where there is no such further conductor $V_{control}$ can conveniently be set to zero.

By applying these approaches individually or in suitable combinations, the potentials of all actuator electrodes, regardless of whether they are in use to eject droplets or not, can be adjusted such that the potential difference across the electrical double layer on each actuator electrode is always maintained below $V_{op}$. The choice of a particular method or combinations of methods listed above (or other methods by which actuator electrodes can be adjusted to potentials such that the potential difference across the electrical double layer on each actuator electrode is always maintained below $V_{op}$) is influenced, for example, by the capabilities of the control and drive electronics circuitry, often in the form of an application-specific integrated circuit ('ASIC'), that is available to the printhead manufacturer.

It is not practical to measure directly the potential differences $\Delta V_{DL1}$ and $\Delta V_{DL2}$ across the double layers DL1$_{mn}$ and double layers DL2$_{mn}$ of electrodes formed upon a piezoelectric actuator within a shared wall piezoelectric printhead during its operation. Therefore, a number of simulations of the effect of (i) capacitive coupling between FET output stages of a power source subsystem and the primarily capacitive load presented by such electrodes, and (ii) resistive coupling between such electrodes in the case where $V_{control}=0$ were performed using the electronics software package LTSpice IV. Results of such simulations are shown in FIGS. 14, 15A, 15B, 16, 17A, and 17B.

In these simulations, the power source system provides a pulsatile unipolar voltage waveform that is representative of waveforms used in practical shared-wall piezoelectric printheads. In all simulated cases, the pulsatile waveform was applied to one electrode whilst its nearest-neighbour electrodes were held at ground potential. The condition $C_s/2 \gg C_p$ was imposed so that it was justified to exclude the effect of impedance paths other than between the driven electrode and its nearest neighbours. The resulting circuits 1400 and 1600 are therefore as shown in FIGS. 14 and 16, whilst the simulated potential difference waveforms are depicted in FIGS. 15A and 15B and FIGS. 17A and 17B respectively.

Figure 14:
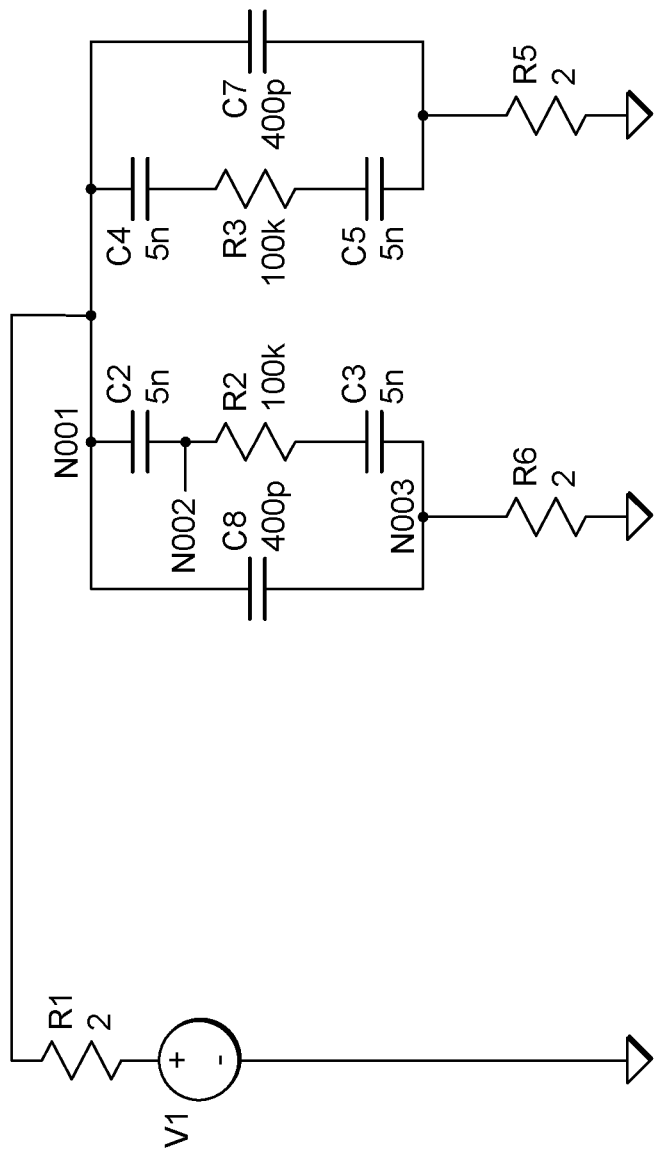
FIGS. 14 and 16 show circuits simulated using the electronics software package LTSpice IV.
Figure 16:
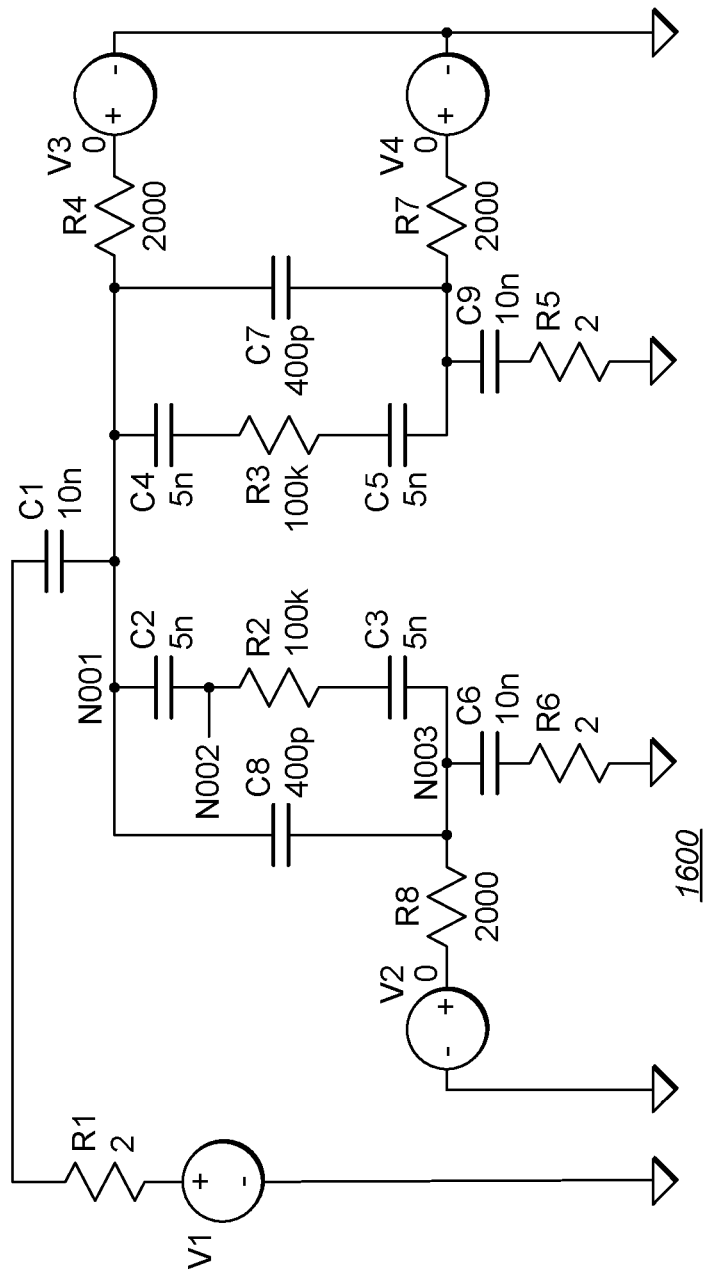

With reference to FIGS. 14 and 16, a voltage source V1 provides the pulsatile unipolar voltage waveform. For example, V1 may be the FET output stages within 'Drive 0' shown at 1113$_0$, within FIG. 11. Resistor R1 represents the combination of the source resistance of voltage source V1 and the resistance from that source of wiring (e.g., wiring 1112$_0$) to the driven electrode (e.g., electrode 1111$_0$). C7 is the capacitance $C_p$ of a first of the two nearest-neighbour piezoelectric actuators with which the driven electrode is in electrical contact (e.g. the capacitance $C_p$ between electrodes 1111$_0$ and 1111$_{-1}$).

C4, R3, and C5 represent the capacitive and resistive elements of the impedance $Z_i$ (e.g. 1000) as shown in FIG. 10A formed between the driven electrode (e.g., electrode 1111$_0$) and the electrode electrically in contact with that first piezoelectric actuator (e.g., electrode 1111$_{-1}$. In particular, C4 represents the capacitance of double layer DL1$_{01}$ formed adjacent the drive electrode, C5 represents the capacitance of double layer DL2$_{10}$ formed adjacent that neighbouring electrode, and R3 represents the resistance $R_{iconic}$ for current flow between those double layers.

R5 represents the resistance of the path to ground from that neighbouring electrode (e.g., electrode $1111_{-1}$). This includes, for example, the resistance of the wiring $1112_{-1}$ and that of the FET output stage of 'Drive –1' when its FETs are switched to provide output $V_0=0$. C8 is the capacitance $C_p$ of a second of two nearest-neighbour piezoelectric actuators with which the driven electrode is in electrical contact (e.g., the capacitance $C_p$ between the electrodes $1111_0$ and $1111_1$).

C2, R2, and C3 represent the capacitive and resistive elements of the impedance $Z_i$ (e.g. $1140_{01}$) formed between the driven electrode (e.g., electrode $1111_0$) and the electrode electrically in contact with that second piezoelectric actuator (e.g., electrode $1111_1$). In particular, C2 represents the capacitance of double layer $DL1_{0-1}$ formed adjacent the drive electrode, C3 represents the capacitance of double layer $DL2_{-10}$ formed adjacent that neighbouring electrode, and R2 represents the resistance $R_{iconic}$ for current flow between those double layers. R6 represents the resistance of the path to ground from that neighbouring electrode (e.g., electrode $1111_1$). This includes, for example, the resistance of the wiring $1112_1$ and that of the FET output stage of 'Drive 1' when its FETs are switched to provide output $V_0=0$.

The circuit 1600 of FIG. 16 includes additional components to those included in the circuit 1400 shown in FIG. 14. Capacitor C1 (e.g., capacitor $1250_0$ in FIG. 12) represents the series capacitor $C_s$ connected between the voltage source V1 (e.g., the FET output stages within 'Drive 0' shown at $1113_0$) and the driven electrode (e.g., electrode $1111_0$). Capacitor C9 (e.g., capacitor $1250_{-1}$) represents the series capacitor $C_s$ connected between the electrode (e.g., electrode $1111_{-1}$) of the first of two nearest-neighbour piezoelectric actuators with which the driven electrode (e.g., electrode $1111_0$) is in electrical contact and the corresponding FET output stage output (e.g., the FET output stages within 'Drive –1'). Capacitor C6 (e.g., capacitor $1250_1$) represents the series capacitor $C_s$ connected between the electrode (e.g., electrode $1111_1$) of the second of two nearest-neighbour piezoelectric actuators with which the driven electrode (e.g., electrode $1111_0$) is in electrical contact and the corresponding FET output stage output (e.g., the FET output stages within 'Drive 1'.

Resistor R4 of the circuit 1600 connects the driven electrode (e.g., electrode $1111_0$) to a control voltage V3=0. Resistor R7 connects the electrode (e.g., electrode $1111_{-1}$) of the first of two nearest-neighbour piezoelectric actuators with which the driven electrode (e.g., electrode $1111_0$) is in electrical contact to a control voltage V4=0. Resistor R8 connects the electrode (e.g., electrode $1111_1$) of the second of two nearest-neighbour piezoelectric actuators with which the driven electrode (e.g., electrode $1111_0$) is in electrical contact to a control voltage V2=0.

Node N001 is located at the common electrode connecting the capacitors C7 and C8, node N003 is located at the opposing electrode of the capacitor C8 and node N002 is located at the double layer $DL1_{0-1}$.

Figures C15A and 15B shows graphs, arising from the circuit of FIG. 14, of (i) the applied voltage waveform (unipolar voltage waveform comprising 8 voltage pulses each of 10V and lasting for 6 μs, spaced apart by a potential of 0V lasting for 12 μs, where after the final pulse, the potential is set to 0V), at node N001, labelled V[n001], (ii) the resulting potential difference across one of the two load capacitances $C_p$ representing one of the two piezoelectric actuators and labelled V [N001, N003], and (iii) the potential differences $\Delta V_{DL1}$ and $\Delta V_{DL2}$ appearing across the double layers $DL1_{0-1}$, $DL1_{01}$, $DL2_{-10}$, and $DL2_{10}$. Note that all four of these potential differences superimpose, i.e. are the same so only one trace, labelled V [N001, N002] is shown.

Figure 15A:
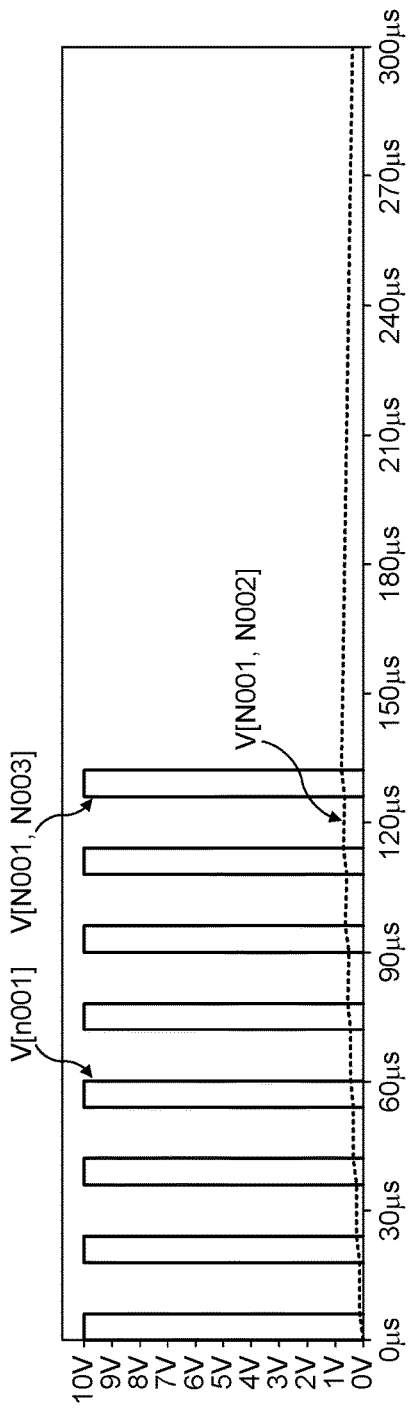
FIGS. 15A and 15B show a graph of potential difference resulting from the circuit shown in FIG. 14.
Figure 15B:
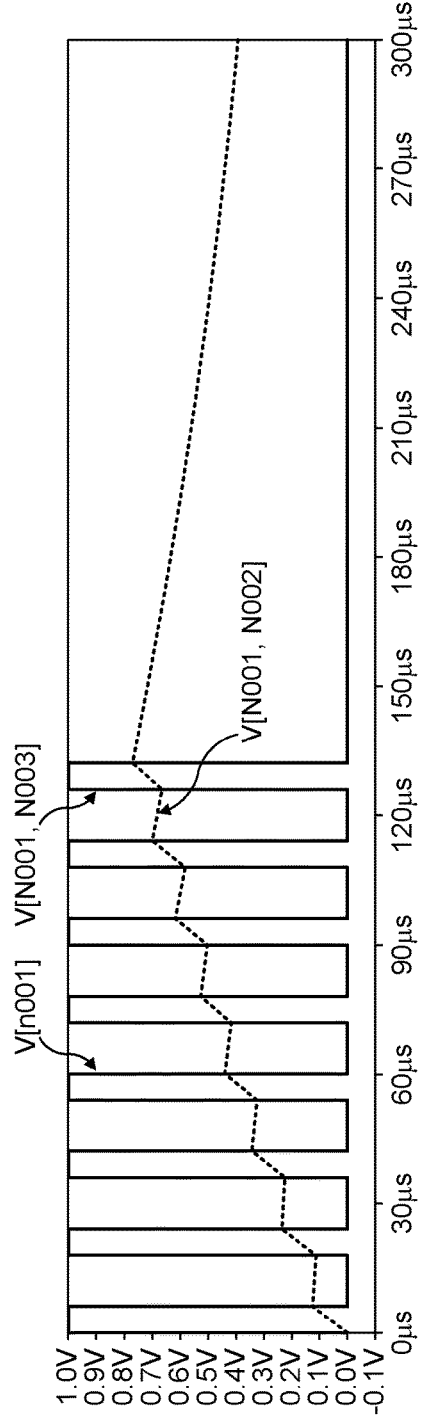

FIG. 15B shows the same graph as FIG. 15A, although FIG. 15B gives an enlarged y-axis scale so that the value of these potential differences $\Delta V_{DL1}$ and $\Delta V_{DL2}$ can be more easily discerned.

FIGS. 17A and 17B show equivalent graphs arising from the circuit of FIG. 16. FIG. 17B shows the same graph as FIG. 17A, although FIG. 17B gives an enlarged y-axis scale so that the value of the potential differences $\Delta V_{DL1}$ and $\Delta V_{DL2}$ can be more easily discerned.

It can be seen from these graphs that, for the same circuit, components, and drive conditions, the introduction of capacitances $C_s$ and resistances $R_s$ greatly reduces the potential differences $\Delta V_{DL1}$ and $\Delta V_{DL2}$ appearing across the double layers $DL1_{0-1}$, $DL1_{01}$, $DL2_{-10}$ and $DL2_{10}$, whilst only slightly reducing the magnitude of the 'voltage step' across load $C_p$ provided by the pulses. It can further be seen that, without introduction of the capacitances $C_s$ and resistances $R_s$, $\Delta V_{DL1}$, and $\Delta V_{DL2}$ would exceed the threshold overpotential typical of aqueous electrolytes so that electrochemical electrode corrosion would occur. However, with capacitances $C_s$ and resistances $R_s$ added to the circuit, $\Delta V_{DL1}$ and $\Delta V_{DL2}$ do not exceed the threshold overpotential typical of aqueous electrolytes; so that electrochemical electrode corrosion does not occur.

Notably, without capacitances $C_s$ and resistances $R_s$, when $\Delta V_{DL1}$ and $\Delta V_{DL2}$ exceed the threshold overpotential, the impedance $Z_i$ must properly be represented by the circuit of FIG. 10B rather than that of FIG. 10A, i.e., that electrical conduction occurs across the double layers DL1 and DL2 which may be represented by current through the diodes 1007 of FIG. 10B. However, since the methods disclosed herein concern with reducing $\Delta V_{DL1}$ and $\Delta V_{DL2}$ below the threshold overpotential, such that such conduction does not occur, so we do not need to consider this current.

In some embodiments, the capacitors $C_s$ and/or the resistors $R_s$ are integrated onto an interface board that connects the FET output stages of the electrical source system provided by a conventional ink jet printhead drive ASIC and the corresponding drive electrodes of the printhead. These embodiments provide for an easier practical implementation. Further, in some embodiments, the capacitors $C_s$ and and/or resistors $R_s$ are integrated into such an ASIC, thereby providing for a low cost implementation.

The inventors have conducted a number of experiments to apply and confirm the validity of the above-discussed principles and techniques. To conduct these experiments, a number of assemblies similar to those discussed with reference to FIGS. 4 and 5, and comprising two electrodes and an electrolyte solution were made. In particular, first, vapour phase evaporation was used to deposit, onto a glass slide, electrodes of nickel-chromium alloy, with an area of 25 mm by 10 mm and thickness 0.1 μm. Then, the electroded regions of the glass slide were immersed into water (electrolyte solution). The pH of the water was 7.4, the metal ion content was 99 mg/liter, and the electrical conductivity was 500 μS/cm. The threshold overpotential for water of this pH was 0.84V and the double-layer charging time was in the region of 10 ms. The electrodes were connected to a power supply that was capable of providing alternating potentials exceeding the threshold overpotential of the assembly and providing alternating periods significantly shorter than the double-layer charging time.

Figure 18:
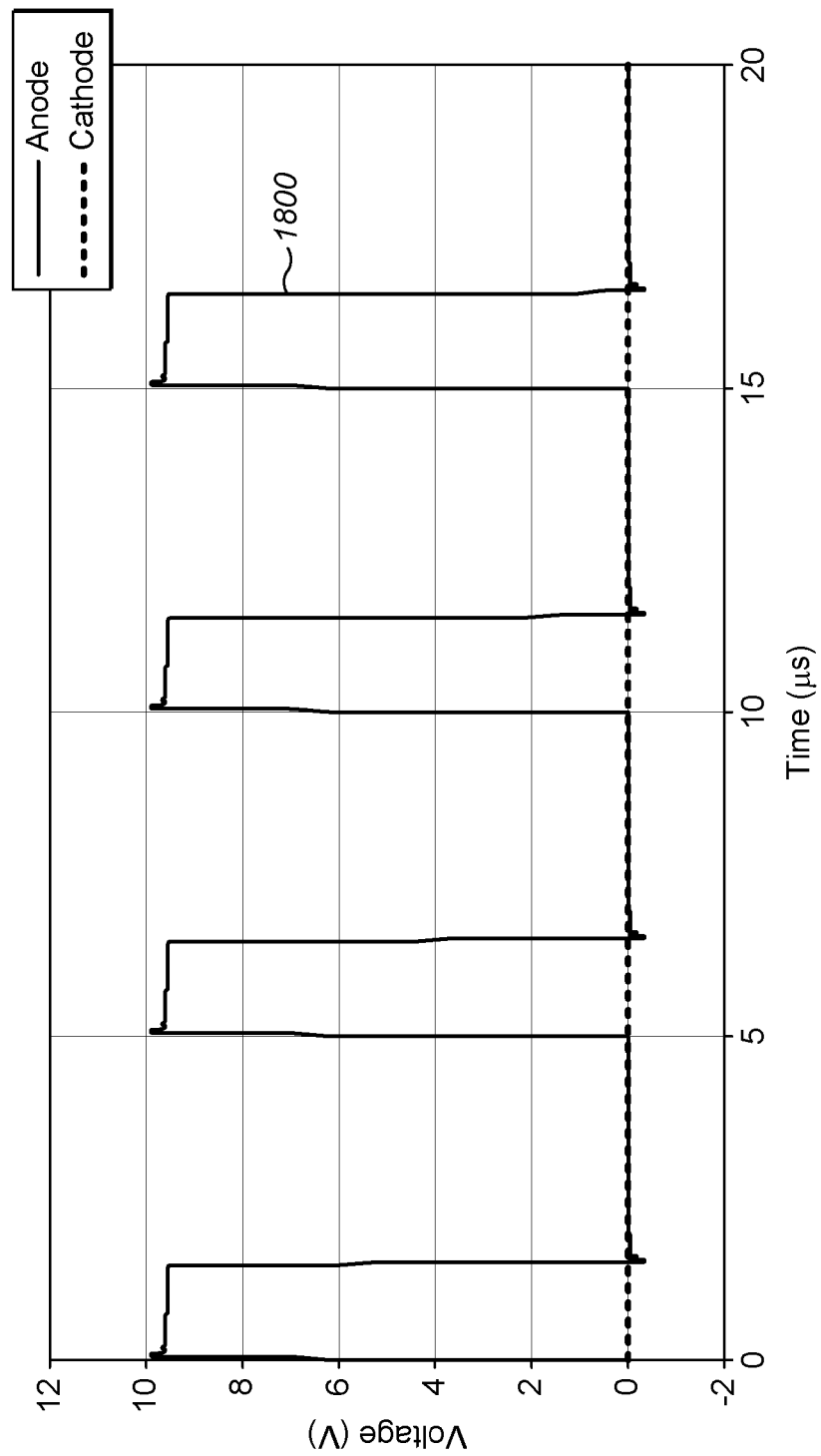
FIG. 18 shows a potential difference waveform applied to an anode and a cathode immersed in water, according to one experiment.
Figure 19A:
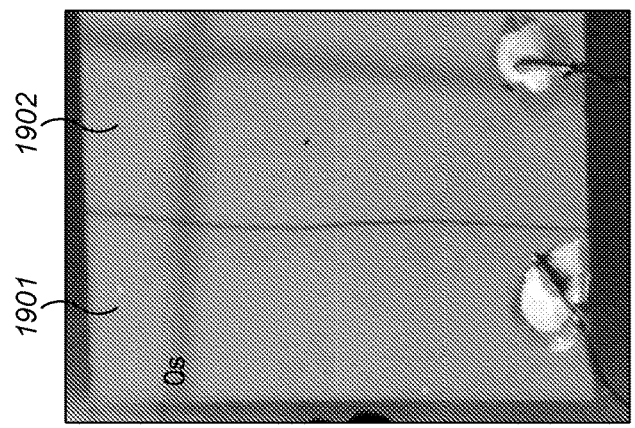
FIGS. 19A, 19B, and 19C show the anode and cathode at different time stages of the potential waveform of FIG. 18 being applied.
Figure 19B:
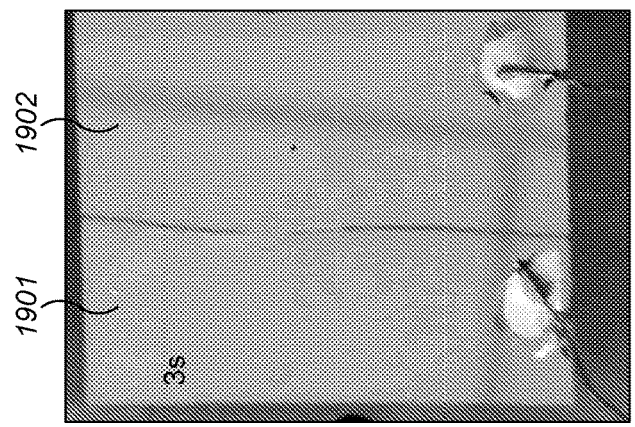
Figure 19C:
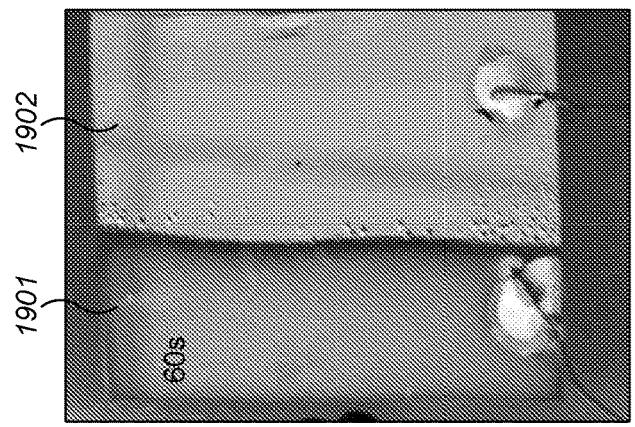

FIGS. 19A to 19C show the anode 1901 and cathode 1902 immersed in water. In the first experiment, a voltage having the waveform 1800, shown in FIG. 18, was applied to the immersed anode 1901 whilst the voltage of the cathode 1902 was held at 0V. The applied potential difference between anode 1901 and cathode 1902 had a frequency of 200 kHz, reaching a maximum of 10V and a minimum of 0V. The average applied potential difference was 2.8V. In this experiment, both the periodic maximum potential difference (10V) and the average potential difference (2.8V), measured over a time period greater than the double layer charging time, exceeded the threshold overpotential of 0.84V.

The inventors observed during this experiment that once the potential difference of the waveform 1800 shown in FIG. 18 was applied, irreversible processes occurred at the electrodes 1901 and 1902 immersed in the water. In particular, at the anode 1901, metal atoms of the electrode were oxidised to form metal ions and those metal ions left the anode 1901 and were solvated by the electrolyte solution. Specifically, for the metals used, the following chemical reactions occurred:

$$Ni \rightarrow Ni^{2+} + 2e^-$$

$$Cr \rightarrow Cr^{2+} + 2e^-$$

At the cathode 1902, protons present in the water were reduced, and hydrogen gas was produced:

$$2H^+ + 2e^- \rightarrow H_2$$

The rate of the reactions was such that gas bubbles started generating at the cathode 1902 in less than three seconds of the application of the potential difference waveform 1800. FIG. 19C shows the electrodes 1901 and 1902 after 60 seconds. Damage to the anode 1901 and bubbles of gas at the cathode 1902 can be clearly seen.

Figure 20A:
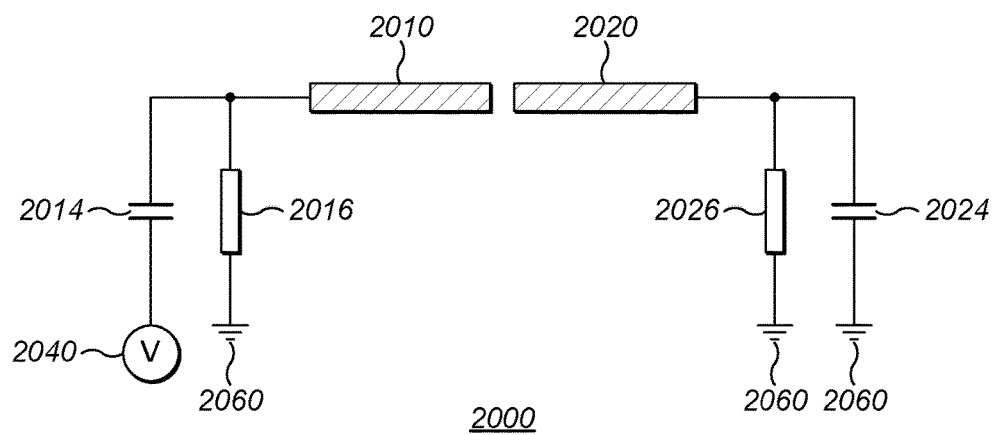
FIG. 20A shows an electrical circuit used in another experiment.

In a second experiment, a similar potential difference waveform was applied through some additional components, as described with reference to FIGS. 16, 17A, and 17B, to a similar assembly of anode 1901 and cathode 1902. In particular, a circuit, 2000, as shown in FIG. 20A has been employed in this experiment to apply the potential difference waveforms. A capacitor, 2014, with value 2.2 nF was placed in series with the power supply 2040 and anode 2010. A resistor, 2016, with value 10 kΩ was placed in series with anode 2010 and electrical ground 2060. Similarly a capacitor, 2014, with value 2.2 nF, was placed in series with cathode 2020 and electrical ground 2060, and a resistor 2026 with value 10 kΩ was placed in series with cathode 2020 and electrical ground.

The anode and cathode assembly were made using the same vapour phase techniques as described with reference to FIGS. 19A to 19C. In this experiment however the anode 2010 and the cathode 2020 measured approximately 1.5 mm by 0.5 mm and were separated by a gap of 100 μm.

The anode and cathode assembly was immersed in water, as further described with reference to FIG. 19A to 19C. The applied potential difference applied from the power supply 2040 between capacitor 2014 and ground had a frequency of 200 kHz, a maximum of 10V and a minimum of 0V. The average applied potential difference was 4.6V. In this experiment, both the periodic maximum potential difference (10V) and the average potential difference (4.6V), measured over a time period greater than the double layer charging time, exceeded the threshold overpotential of 0.84V.

Figure 20B:
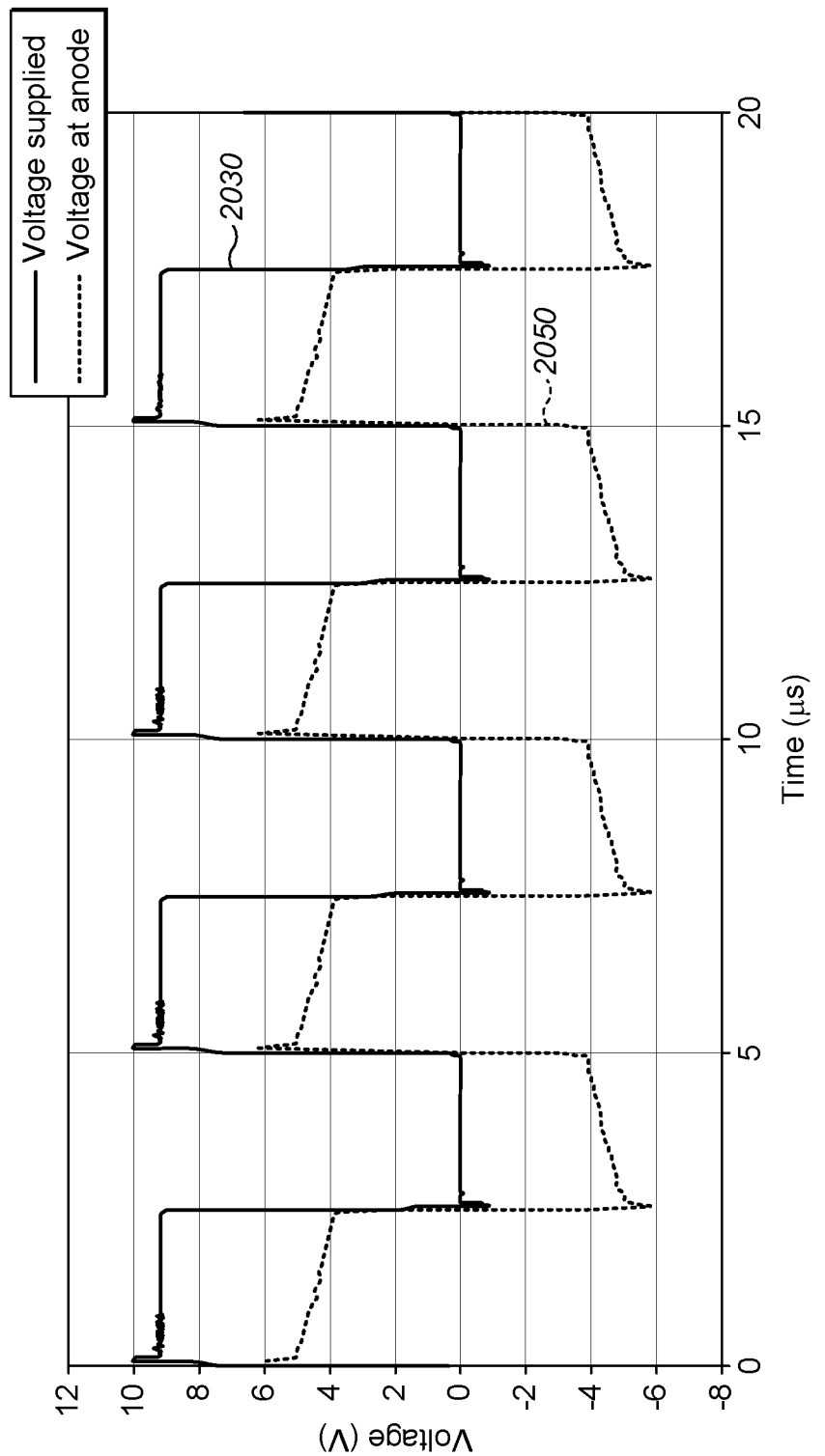
FIG. 20B shows an output waveform applied to the circuit shown in FIG. 20A.

FIG. 20B shows the output waveform voltage 2030 applied using power supply 2040. The voltage at the anode 2010 was measured with reference to ground and is shown as trace 2050 in FIG. 20B. The voltage at the cathode 2020 was measured was measured with reference to ground; the magnitude of the voltage at the cathode 2020 never exceeded 0.4V. The voltage difference applied between anode 2010 and cathode 2020 is such that the average potential difference measured over a time period greater than the double layer charging time, is lesser than the threshold overpotential.

The output waveform 2030 was applied to the circuit 2000 for over 14 hours. During this time there was no visible damage to the anode 2010, and no visible generation of gas at the cathode 2020.

Figure 20C:
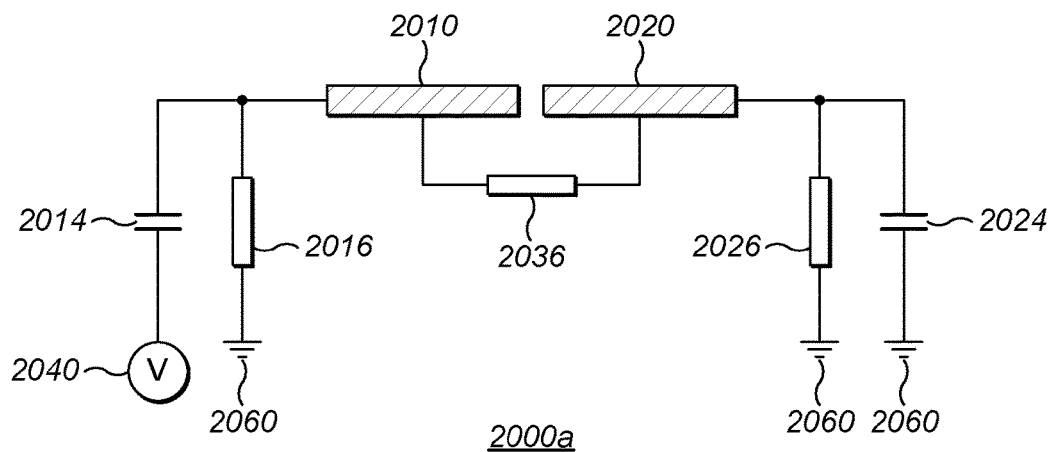
FIG. 20C shows a resistive load added to the circuit shown in FIG. 20A.

FIG. 20C shows a circuit 2000a, which is the circuit 2000 of FIG. 20A modified by adding a resistive load 2036. More specifically, the resistive load 2036 in the form of a resistor of resistance 1 kΩ was connected between the pair of water-immersed electrodes 2010 and 2020. A rectangular pulse waveform with minimum voltage of 0V and maximum voltage of +10V was applied to the additional components as described with reference to FIG. 20A. A time varying voltage was measured across the 1 kΩ resistor with maximum voltage of +8V and minimum voltage of −7V. The non-zero voltage confirms that electrical energy has been supplied to the resistive load by that waveform.

The examples given above refer to shared wall inkjet printheads. It is however to be understood that the skilled person may apply the details of the invention to other types of inkjet printheads, including, but not limited to, thermal, piezo, and MEMs, printheads. In context of inkjet printheads, examples of electrical conductors include, but are not limited to, actuator electrodes, ink supply pipes, nozzle plates, support structures and substrates, thermal heaters, conductors associated with supply of electrical energy to such heaters and actuator electrodes, and the like.

Further, although specific examples of circuits are depicted in FIGS. 12 and 13, the methods and systems disclosed herein are not limited to such circuits and other circuit variations are possible and can be used depending on a specific application and/or desired effects. Generally, not every electrical conductor in a circuit necessarily requires or would have a respective capacitor and/or a respective resistor. For example, such variations include but are not limited to the following examples: a capacitor can be provided for only one of the electrical conductors in the circuit, a capacitor can be provided per pair of electrical conductors, one or two capacitors can be provided for some of the pairs of electrical conductors in the circuits, a resistor can only be provided for those electrical conductors that are coupled to a power source by respective capacitors, resistors can only be provided for some of the electrical conductors coupled to the power source by the respective capacitors, a resistor can be provided only for one of the electrical conductors in the circuit, a single resistor can be provided per pair of electrical conductors, or different common conductors can be used for different groups of resistors. It should be noted that if a resistor is provided for only one of the electrical conductors, such a resistor requires a control potential to complete the circuit.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) and/or the overall system including the processor to perform at least some of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

The order of execution or performance of the operations in the embodiments illustrated and described herein is not essential, unless otherwise specified. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

It is to be understood that the present disclosure includes permutations of combinations of the optional features set out in the embodiments described above. The skilled person may implement the details of the invention in several alternative ways within the scope of the attached claims. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A system for controlling supply of electrical energy from at least one power source through a plurality of electrical conductors adjacent to a common electrolyte solution, the system comprising:
   circuitry configured to control the at least one power source to apply a first potential difference waveform between a first pair of electrical conductors from the plurality of electrical conductors; and
   a capacitor coupling a first electrical conductor in the first pair to the at least one power source,
   wherein the circuitry is configured to control the at least one power source to apply the first potential difference waveform of a magnitude that exceeds a threshold overpotential for the first pair of electrical conductors in the electrolyte solution while maintaining a sum of
      (i) an absolute value of a potential difference across a double layer associated with the first electrical conductor in the first pair, and
      (ii) an absolute value of a potential difference across a double layer associated with a second electrical conductor in the first pair
   below the threshold overpotential for the first pair.

2. The system of claim 1, further comprising:
   a second capacitor coupling the second electrical conductor to the at least one power source.

3. The system of claim 1, wherein the circuitry is configured to control the at least one power source to apply a second potential difference waveform between a second pair of electrical conductors from the plurality of electrical conductors, the system further comprising:
   a third capacitor coupling a third electrical conductor in the second pair to the at least one power source,
   wherein, wherein the circuitry is configured to control the at least one power source to apply the second potential difference waveform of a magnitude that exceeds a threshold overpotential for the second pair of electrical conductors in the electrolyte solution, while maintaining, a sum of
      (i) an absolute value of a potential difference across a double layer associated with the third electrical conductor in the second pair, and
      (ii) an absolute value of a potential difference across a double layer associated with a fourth electrical conductor in the second pair
   below the threshold overpotential for the second pair.

4. The system of claim 3, wherein the first pair of electrical conductors and the second pair of electrical conductors have a common electrical conductor.

5. The system of claim 1, further comprising a first resistor and a second resistor coupled together, the first resistor coupled to the first electrical conductor and the second resistor coupled to the second electrical conductor, the first and second resistors configured to discharge potential difference between the first and second electrical conductors.

6. The system of claim 5, further comprising a control voltage source coupling the first and second resistors, the first and second resistors further configured to discharge potential difference between the first and second electrical conductors and the control voltage source.

7. The system of claim 1, wherein the system is configured to supply electrical energy to a load.

8. The system of claim 7, wherein the load comprises a plurality of piezoelectric actuators of a piezoelectric ink jet printhead.

9. A method of supplying energy from an electrical power source system having at least one power source through a plurality of electrical conductors adjacent to a common electrolyte solution, the method comprising:
   controlling the power source system to apply potential differences between electrical conductors in a first pair of electrical conductors selected from the plurality of electrical conductors to maintain a sum of
      (i) an absolute value of a potential difference across a double layer associated with a first electrical conductor in the first pair, and
      (ii) an absolute value of a potential difference across a double layer associated with a second electrical conductor in the first pair
   below a threshold overpotential for the first pair of electrical conductors in the electrolyte solution,
   wherein the potential differences applied between the electrical conductors in the first pair are characterized by a waveform having a magnitude exceeding the threshold for the first pair of electrical conductors.

10. The method of claim 9, wherein a magnitude of at least one of the applied potential differences exceeds one and a half times the threshold overpotential for the first pair of electrical conductors for a period shorter than a shortest of double layer charging times associated with the first pair of electrical conductors,
wherein a double layer charging time is a time constant characterizing charging of a double layer associated with an electrical conductor adjacent to an electrolyte solution.

11. The method of claim 9, wherein the energy from the at least one power source is supplied to the first pair of electrical conductors through a first capacitor coupling the first electrical conductor in the first pair to the at least one power source.

12. The method of claim 11, wherein the energy from the at least one power source is supplied to the first pair of electrical conductors through a second capacitor coupling the second electrical conductor in the first pair to the at least one power source.

13. The method of any of claim 9, further comprising:
discharging potential difference between the first electrical conductor in the first pair and a control voltage source using a first resistor coupling the first electrical conductor in the first pair and the control voltage source.

14. The method of claim 9, wherein the energy from the at least one power source is supplied through the plurality of electrical conductors to a load.

15. The method of claim 14, wherein the load is a plurality of piezoelectric actuators of a piezoelectric ink jet printhead.

16. The method of claim 9, wherein:
the waveform comprises a plurality of sub-waveforms of finite duration,
an average potential difference of the potential differences applied between the electrical conductors in the first pair is smaller than the threshold overpotential for the first pair of electrical conductors, and
the average potential difference is calculated over a time interval of the first waveform that is equal to or greater than the shortest double layer charging time associated with the first pair of electrical conductors.

17. The method of claim 16, wherein the waveform has no frequency component below 500 Hz whose magnitude exceeds the threshold overpotential for the first pair of electrical conductors.

18. The method of claim 9, wherein the sum of the absolute values of the potential differences across the double layers associated respectively with the electrical conductors in the first pair is maintained below an absolute value of a smallest of potential differences between any of the plurality of electrical conductors that cause an electrolyte current to flow through the electrolyte solution between the conductors.

19. The method of claim 9, wherein:
the energy is supplied through one or more pairs of electrical conductors, selected from the plurality of electrical conductors, to one or more actuators associated with the one or more pairs of electrical conductors to cause ejection of one or more droplets of the electrolyte solution from at least one of one or more chambers housing the electrolyte solution,
wherein each of the one or more first actuators is configured to cause ejection of a droplet from the at least one chamber upon reaching a respective displacement level.

20. A system for a printhead, the system comprising:
a plurality of actuator electrodes of the printhead;
one or more chambers configured to house an ink adjacent to the plurality of actuator electrodes;
an electronic circuitry configured to control ejection of electrolyte droplets from the ink by controlling a power source system coupled to the system for the printhead,
wherein the electronic circuitry is configured to control the power source system to apply potential differences between the actuator electrodes in each of one or more pairs of actuator electrodes selected from the plurality of actuator electrodes to maintain a sum of
(i) an absolute value of a potential difference across a double layer associated with a first actuator electrode in the pair, and
(ii) an absolute value of a potential difference across a double layer associated with a second actuator electrode in the pair
below a threshold overpotential for the pair of actuator electrodes, in the ink,
wherein the potential differences applied between the actuator electrodes in each pair are characterized by a waveform having a magnitude exceeding the threshold overpotential for the pair of actuator electrodes,
wherein each of the one or more first actuators is configured to cause ejection of a droplet from a respective chamber upon reaching a respective displacement level; and
a reference electrical conductor, electrically shielded from the electrolyte solution, the reference electrical conductor configured to maintain reference data concerning average potentials with respect to ground potential of the actuator electrodes of the printhead and make the reference data available to the electronic circuitry.

* * * * *